US006925121B1

(12) United States Patent
Komiya et al.

(10) Patent No.: US 6,925,121 B1
(45) Date of Patent: Aug. 2, 2005

(54) MOTION VECTOR DETECTING METHOD AND SYSTEM AND DEVICES INCORPORATING THE SAME

(75) Inventors: Daisaku Komiya, Tokyo (JP); Tsutomu Uenoyama, Kawasaki (JP); Kazunori Yamada, Tokyo (JP); Hiroaki Yoshio, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/164,333

(22) Filed: Oct. 1, 1998

(30) Foreign Application Priority Data

Oct. 1, 1997 (JP) .............................. 9-283162
Aug. 3, 1998 (JP) ........................... 10-229949

(51) Int. Cl.$^7$ ............................... H04N 7/12
(52) U.S. Cl. ........................ 375/240.16; 375/240.17; 348/699
(58) Field of Search ................... 375/240.16, 240.08, 375/240.2, 240.24, 240.25, 240.17; 348/416.1, 402.1, 407.1, 699; 382/236, 238, 243, 248, 250; 386/111; 358/261.2, 428, 430

(56) References Cited

U.S. PATENT DOCUMENTS

| | | | | |
|---|---|---|---|---|
| 5,631,744 A | * | 5/1997 | Takeuchi et al. ............ 358/432 |
| 5,832,120 A | * | 11/1998 | Prabhakar et al. .......... 382/233 |
| 5,973,741 A | * | 10/1999 | Takashima et al. ......... 348/416 |
| 6,002,801 A | * | 12/1999 | Strongin et al. ............. 382/233 |
| 6,025,879 A | * | 2/2000 | Yoneyama et al. ......... 348/416 |
| 6,028,634 A | * | 2/2000 | Yamaguchi et al. ........ 348/402 |
| 6,115,070 A | * | 9/2000 | Song et al. ................. 348/402 |
| 6,134,270 A | * | 10/2000 | Mou .......................... 375/240 |

OTHER PUBLICATIONS

Information technology—Coding of moving pictures and associated audio for digital storage media at up to about 1,5 Mbit/s—Part 2: Video; ISO/IEC 11172–2:1993(E); pp. 1–9.
Information technology—Generic coding of moving pictures and associated audio information: Video; ISO/IEC 13818–2:1996(E); pp., 5–9.

* cited by examiner

*Primary Examiner*—Vu Le
(74) *Attorney, Agent, or Firm*—Israel Gopstein

(57) ABSTRACT

A system of detecting a motion vector for an object block in a current frame of an orthogonally transformed video with respect to a stored reference frame. The motion vector is detected by: extracting a predetermined pattern of lower frequency components from the object block; orthogonally inverse transforming the extracted lower frequency components within the pattern to yield the pattern of pixel data; searching the reference frame for a block having a maximum correlation with the pattern of pixel data; and calculating the motion vector from the object block to the block having a maximum correlation. As an orthogonal transform, DCT (discrete cosine transform) is preferable. Creating a row and a column image comprising sums obtained by adding all the pixels in each column and each row of the object block and applying the above searching and calculating process to the row and the column image enables the motion vector detection from a normal or noncompressed video.

44 Claims, 15 Drawing Sheets

FIG. 1
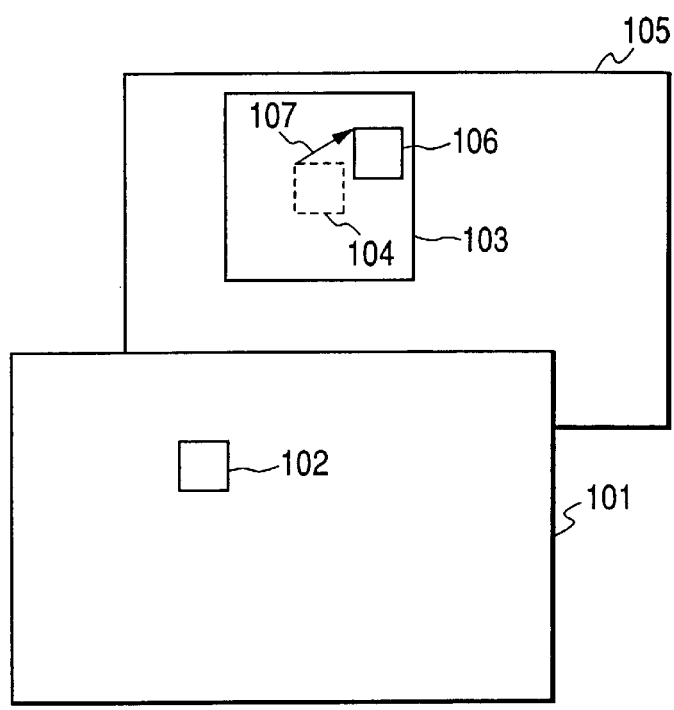
FIG. 2
| (a) | (b) | (c) |
|---|---|---|
| REDUCTION IN THE NUMBER OF MATCHINGS | REDUCTION IN THE AMOUNT OF DATA IN EACH MATCHING | COMBINATION OF (a) AND (b) |
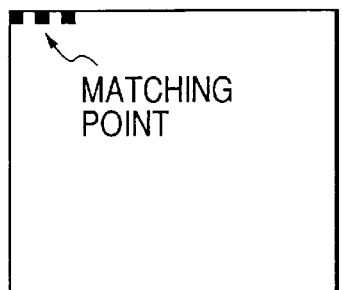
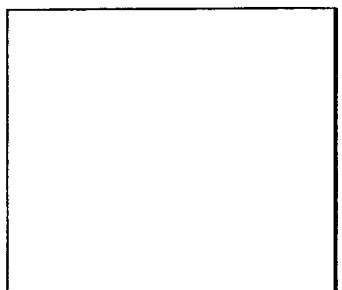
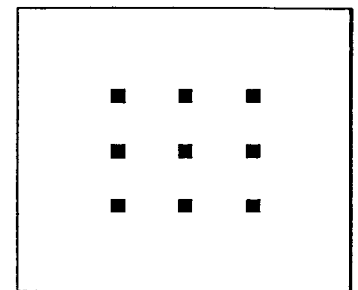

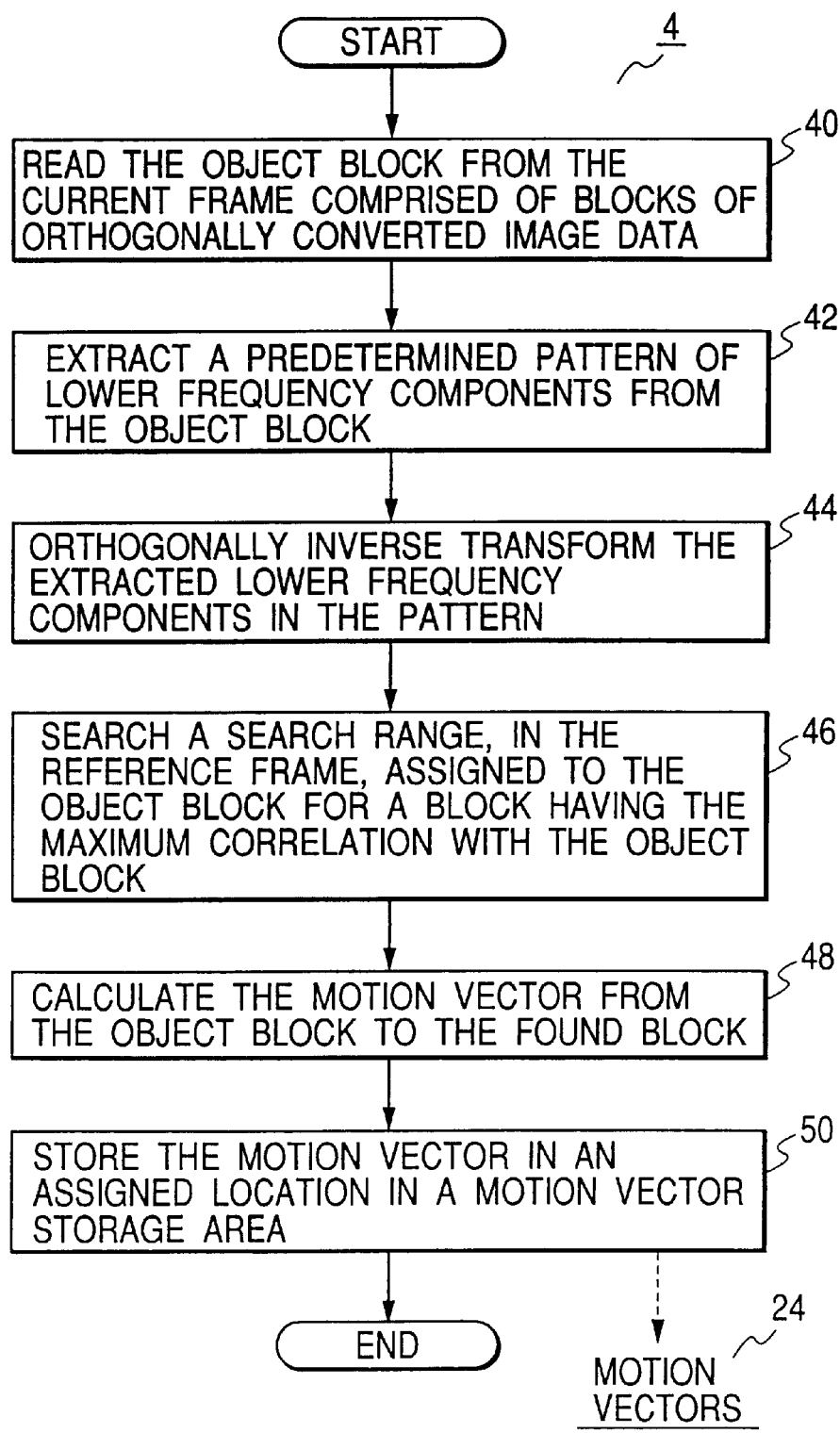

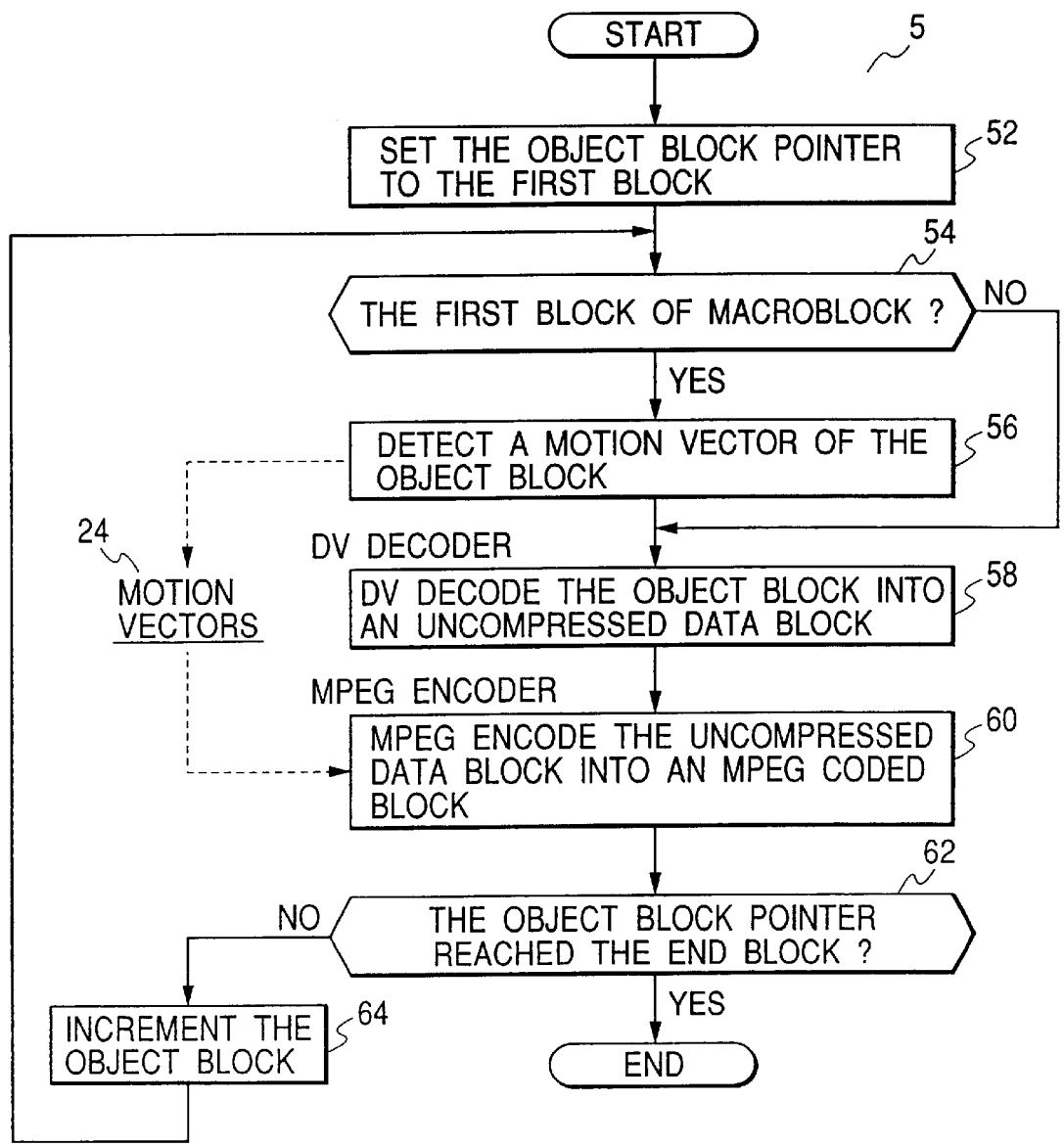

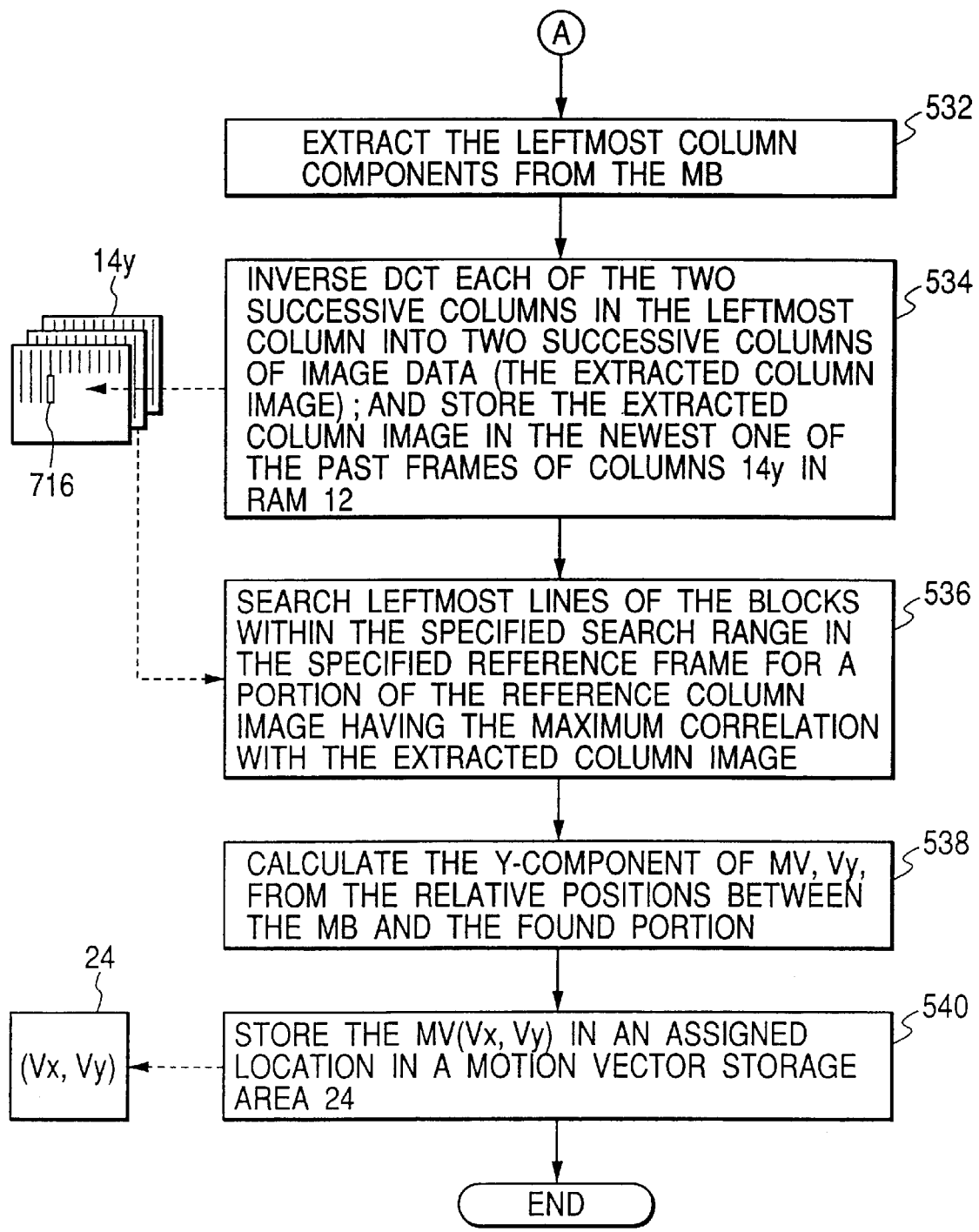

FIG. 9

FROM THE MAIN PROGRAM

OBJECT BLOCK ID
REFERENCE FRAME ID
SEARCH RANGE

START — 600

601 — READ THE OBJECT MB FROM THE CURRENT FRAME COMPRISED OF DCT BLOCKS

602 — EXTRACT THE TOP LEFTMOST BLOCK 4×4 COEFFICIENTS FROM EACH OF THE DCT BLOCKS OF THE MV

604 — INVERSE DCTs EACH OF THE EXTRACTED BLOCKS INTO A LOW RESOLUTION BLOCK OF 4×4 PIXELS; AND STORE THE LOW RESOLUTION BLOCKS IN THE NEWEST PAST FRAME

606 — SEARCH A SEARCH RANGE IN THE REFERENCE FRAME FOR A BLOCK HAVING THE MAXIMUM CORRELATION WITH THE OBJECT BLOCK

608 — CALCULATE THE MOTION VECTOR FROM THE OBJECT BLOCK TO THE FOUND BLOCK

610 — STORE THE MOTION VECTOR IN AN ASSIGNED LOCATION IN A MOTION VECTOR STORAGE AREA

END

24 — MOTION VECTORS

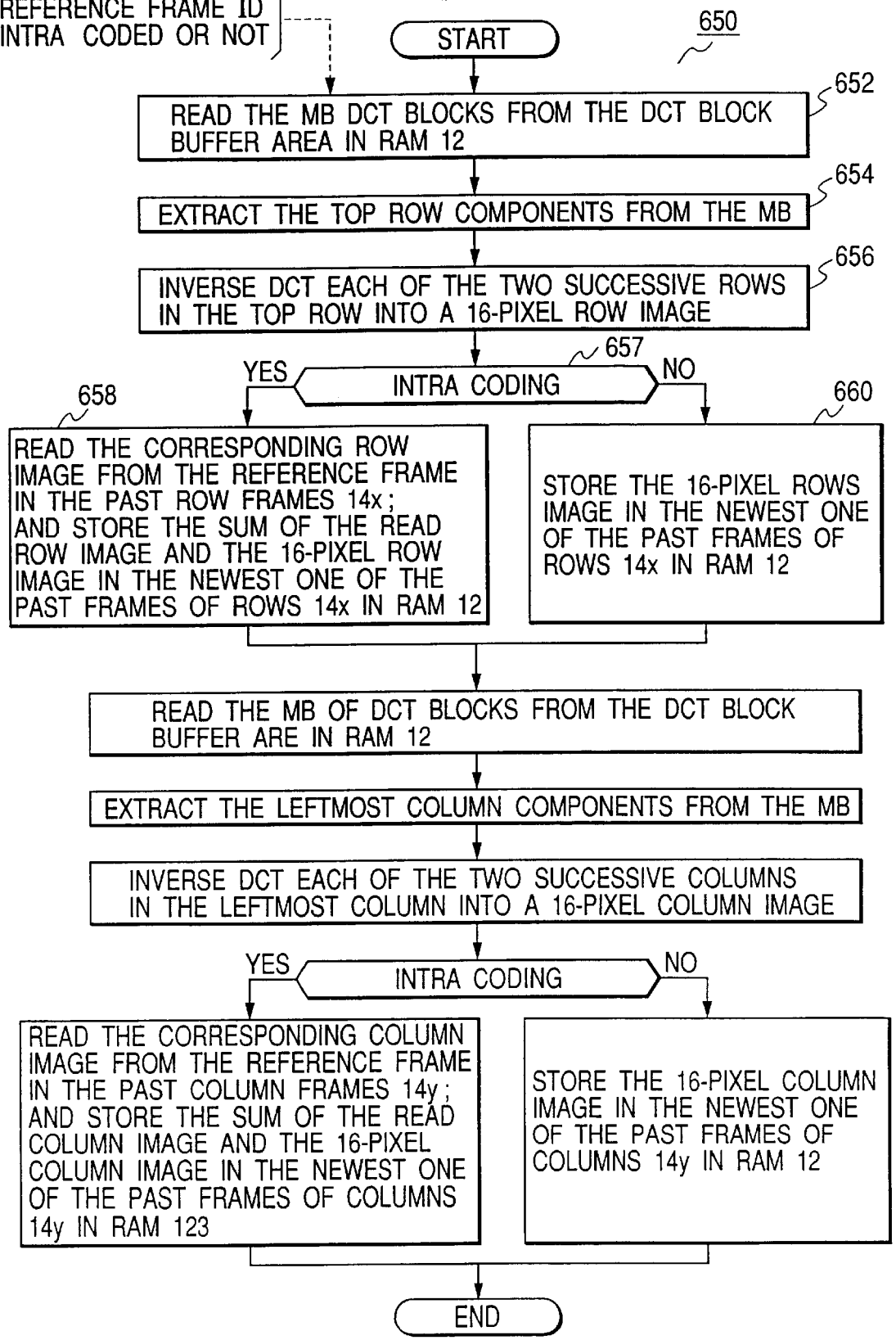

MOTION VECTOR DETECTING METHOD AND SYSTEM AND DEVICES INCORPORATING THE SAME

BACKGROUND OF THE INVENTION

1. Field of the Invention

The invention generally relates to a motion vector detector for use in a motion-compensated video coder and, more particularly, to a motion vector detecting method and system suited for software implementation for providing relatively high-precision motion vectors at a passable speed.

2. Description of the Prior Art

With an increase of systems using digital video signals, various code compression schemes have been proposed to reduce the data quantities of digital video signals used in such systems. Among others, MPEG (Moving Picture Experts Group) 1 and 2 coding are well-known and widely used for video signals used in computers. In these systems, video data are compressed through a combination of a reduction of spatial redundancy in a frame by means of DCT (discrete cosine transform) and a reduction of temporal redundancy between frames by means of the motion compensation. (For further details of MPEG 1, see ISO/IEC 11172—2, "Information technology—Coding of moving pictures and associated audio for digital storage media at up to about 1.5 M bit/s—Part2: Video." Also, for MPEG 2, see ISO/IEC 13818—2, "Information technology-Generic coding of moving pictures and associated audio information—Part2: Video.")

A reduction in spatial redundancy in coded video frames is achieved by motion-compensated coding. In motion-compensated coding, an object block 102 of a current frame 101 being coded is coded by searching a search range 103 defined around the corresponding block 104 in a past frame 105 for a block having the maximum correlation with the object block, i.e., a maximum correlation block 106; calculating a motion vector 107 from the corresponding block 104 to the detected maximum correlation block 106 and a block of difference data between the object block 102 and the maximum correlation block 106 as shown in FIG. 1; and coding the vector and the block of difference data. In MPEG system, the detection of motion vector is performed for each macroblock, i.e., by a unit of 2×2 blocks.

The calculations in the motion compensation account for a considerable portion of the calculations in the coding process. If a motion compensated video coder is to be implemented by software, the amount of calculations of the case where the search range is fully searched calculating the entire block of data in each matching will become impractically large.

For this reason, there have been proposed various speed-up algorithms. FIG. 2 illustrates three of such algorithms.

In algorithm (a), the number of matching operations is reduced by half by executing a matching operation every two bits in a search range 103*a* instead of conducting a full search. However, the steps (precision) of the motion vectors are also halved.

In algorithm (b), searching a full search range 103*b* with sampled data from the object block 102*b* reduces the amount of data in a matching operation. Though the steps of the motion vectors are the same as in the case of an ordinary full search, the reliability of the steps lowers.

In algorithm (c), searches are made not in a constant interval like every two bits but in a variable interval. A range 103*c* is first searched in a larger interval for a representative matching point and then only the neighborhood of the matching point is searched in a decreasing interval for a motion vector.

Various combinations of above-mentioned algorithms are possible. However, in the above-mentioned speed-up algorithms, the higher the detecting speed becomes, the lower the precision of detected motion vectors becomes, causing a lower picture quality. This is because each of the pixels in a noncompressed picture has a same weight, i.e., image information is homogeneously distributed in the pixels. Accordingly, it is impossible to reduce the amount of calculations by reducing the pixels to be used in the motion vector detection without sacrificing the precision of detected motion vectors and accordingly the picture quality as long as moving vectors are detected directly from noncompressed moving pictures.

By the way, as a compressive coding scheme, there is also a DV standard, which is a coding scheme for digital video devices such as digital video cameras etc. The DV standard is published as "Specification of Consumer-Use Digital VDRs," (HD Digital VCR Conference, 1996). In this scheme, compression of image data is achieved by a reduction in spatial redundancy within a frame by DCTing each of the blocks.

The amount of code data per frame compressed by the DV scheme reaches six times that of code data compressed by a standard MPEG 2 scheme. From this viewpoint, MPEG coded data is more suitable for transmission of a video signal through a network such as PSTN (public switched telephone network). However, the frames of DV data are advantageously independent from one another, which facilitates video editing through frame-based cut and paste. Of course, DV data yields pictures of much the better quality for its plenty of codes.

For this reason, our group including the inventors has developed and put to practical use a system which edits moving pictures in a DV format taken in from a digital video camera and converts the format of edited moving pictures into an MPEG format for distribution to PC (personal computer) terminals. In such a system, video data in a DV format is decoded into uncompressed video data; and the uncompressed video data is compressed and coded in the MPEG format. However, if such DV-to-MPEG converter is to be implemented by software with degradation in picture quality held down, a conventional motion vector detecting system requires too much computation.

It is therefore an object of the invention to provide a system and method for detecting a motion vector with a high precision at a high speed from orthogonally transformed moving pictures.

For the purpose of future implementation of a real-time software DV-to-MPEG converter, the speed of motion vector detection has to be further raised.

It is another object of the invention to provide a method and system for use in combination with other higher-precision motion vector detector for detecting a motion vector with a rough precision at a speed of the order of a thirtieth.

Though the above-mentioned objects fails to deal with noncompressed moving pictures, we have succeeded in expanding the principle used in solving the above object to noncompressed or ordinary moving pictures.

It is further object of the invention to provide a method and system for detecting a motion vector with a high precision at a high speed from ordinary moving pictures.

SUMMARY OF THE INVENTION

According to the principles of the invention, a method of detecting a motion vector for an object block in a current frame of an orthogonally transformed video with respect to a stored reference frame is provided. The method comprises the steps of: extracting a predetermined pattern of lower frequency components from the object block; orthogonally inverse transform the extracted lower frequency components within the pattern to yield the pattern of pixel data; searching the reference frame for a block having a maximum correlation with the pattern of pixel data; and calculating the motion vector from the object block to the block having a maximum correlation.

As orthogonal transform, DCT (discrete cosine transform) is preferable.

Using the top row and the leftmost column as the predetermined pattern provides the same level of precision as in case of a two-dimension full search. This is achieved by the steps of: extracting a top row of components from the object block; orthogonally inverse transform the extracted components within the row to yield row pixels; advancing along and searching top rows of the reference frame for a row image having a maximum correlation with the row pixels; calculating an x-component of the motion vector from the top row of the object block to the row image. The same process is also applied to the leftmost column.

If a macroblock that is defined in international moving picture coding standards is used as an object block, a motion vector detector may be applied to video coders of MPEG, H.261 and H.263, and to a DV-to-MPEG converter.

If the object block is a macroblock which is defined in international moving picture coding standards and which contains 4 subblocks, and if the predetermined pattern comprises four squares of 4 by 4 elements, the four squares being disposed in upper left corners of respective subblocks, the motion vector detector provides a motion vector of a low precision at a very high speed. This embodiment is preferably used in combination with a higher precision motion vector detector.

Instead of applying an extraction and inverse DCT processing to a DCT video, creating a row and a column image comprising sums obtained by adding all the pixels in each column and each row of the object block and applying the above searching and calculating process to the row and the column image enables the motion vector detection from a normal or noncompressed video.

BRIEF DESCRIPTION OF THE DRAWING

Further objects and advantages of the present invention will be apparent from the following description of the preferred embodiments of the invention as illustrated in the accompanying drawing, in which:

FIG. 1 is a diagram illustrating how a motion vector is detected;

FIG. 2 is a diagram showing examples of speed up schemes of motion vector detection;

FIG. 4 is a flowchart showing an exemplary operation executed by CPU 10 under the control of a motion vector detector program 4 according to the principles of the invention;

FIG. 5 is a flowchart showing an exemplary operation of a DV-to-MPEG format converter program incorporating a motion vector detector program in accordance with a first illustrative embodiment of the invention;

FIGS. 6A and 6B, when combined at encircled "A", constitute a flowchart showing an operation of a motion vector (MV) detector program 506 according to the principles of the invention;

FIG. 9 is a flowchart showing an exemplary operation of a MV detector program 600 in accordance with a second illustrative embodiment of the invention

FIG. 15 a flowchart showing an operation of a program, for use in a Mv detector, for generating past frames from the DCT blocks supplied from the MPEG coder in which the MV detector is incorporated.

Throughout the drawing, the same elements when shown in more than one figure are designated by the same reference numerals.

DETAILED DESCRIPTION OF THE PREFERRED EMBODIMENTS

Figure 3:
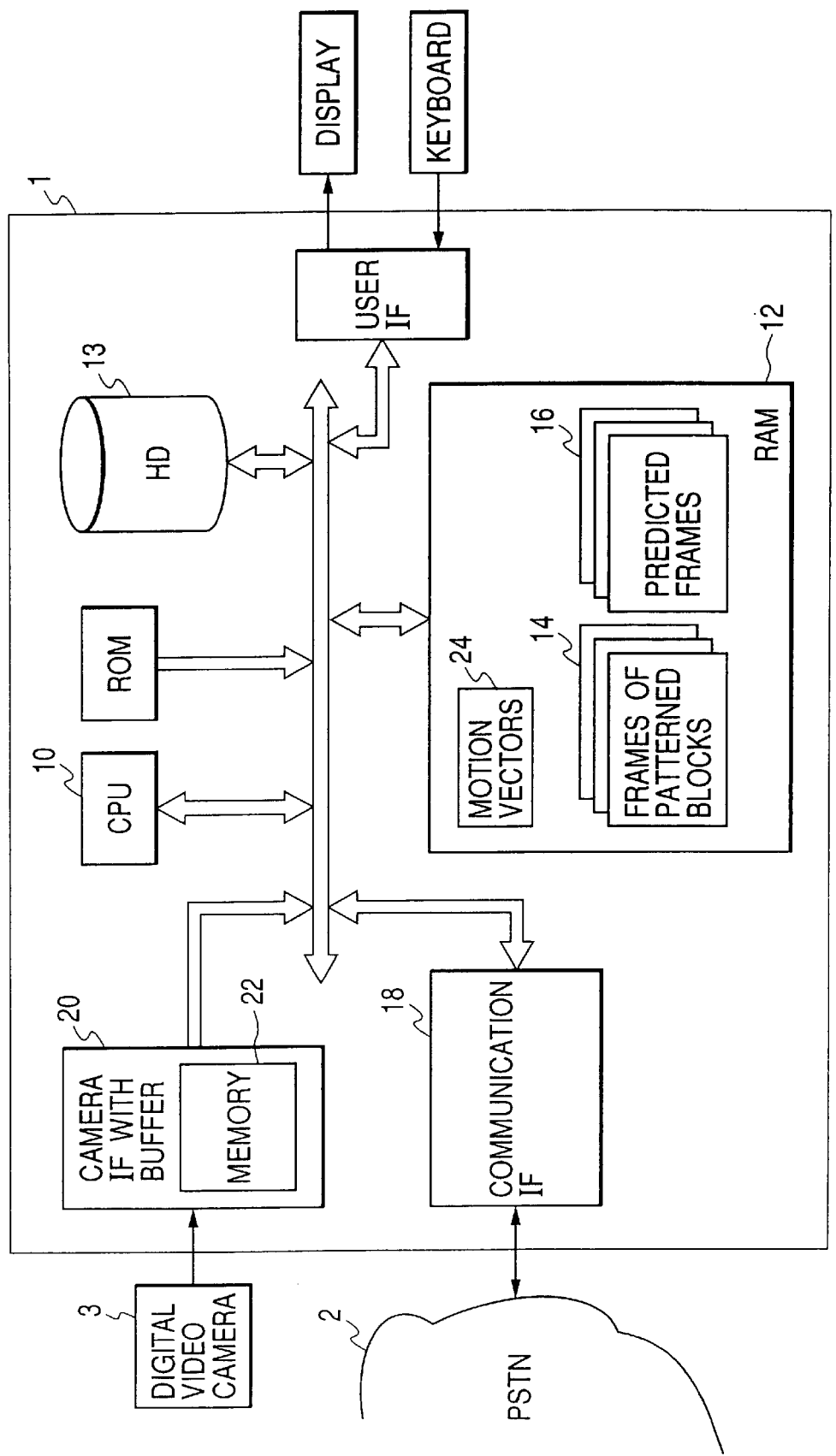
FIG. 3 is a schematic block diagram showing an exemplary hardware system 1 on which the invention is embodied.

FIG. 3 is a schematic block diagram showing an exemplary hardware system 1 on which the invention is embodied. The hardware system 1 may be any suitable computer provided with the following features. The computer 1 preferably comprises a high speed CPU (central processing unit) 10; a memory (RAM) 12 with a sufficient capacity for storing several frames 14 of patterned blocks (detailed later) used in motion vector detection, several frames 16 of predicted pictures used in motion compensation of MPEG coding if the invention is applied to an MPEG coder and various intermediate data; and a communication interface (IF) 18 for communicating video data through a pubic switched telephone network (PSTN) 2. If the computer 1 is used as a DV-to-MPEG converter as described below, the computer 1 preferably has a camera interface (IF) 20 with a buffer function which includes at least a frame's worth of memory 22 so that the computer 1 can take in moving pictures from a digital video camera 3. Detecting a Motion Vector from an Orthogonally transformed Video FIG. 4 is a flowchart showing an exemplary operation executed by CPU 10 under the control of a motion vector detector program 4 for detecting a motion vector of an object block of a current frame with respect to a reference frame of past frames 14 in accordance with the principles of the invention. It is assumed that the current frame is one of the frames or pictures in an orthogonally transformed video supplied through the camera interface 20 or the communication IF 18, which is being processed now. The reference frame is one of the past frames 14 stored in RAM 12 which is being used as a reference of the motion vector detection for the current frame. If the motion vector detecting program is applied to an MPEG coder, then which of the past frames 14 to use as the reference frame is determined by a main routine of the MPEG coder program stored in a hard disk (HD) 13 in case of a software implementation or by a controller of the MPEG coder (not shown) in case of a hardware implementation.

It is noted that the invention may be applied to moving pictures which have been subjected to any suitable orthogonal transform. Since a discrete cosine transform (DCT) is well known as the most efficient orthogonal transform scheme at present and widely used in various standards and recommendations including DV, MPEG, H.261, H.263, etc., we describe the following embodiments in connection with a video comprised of DCT blocks.

If a main program of an application system which incorporates the motion vector detector program 4 of FIG. 4 calls the program 4, then CPU 10 first reads the object block specified by the main routine from the current frame comprised of blocks of orthogonally transformed image data in step 40.

In step 42, CPU 10 extracts a predetermined pattern of lower frequency components (i.e., coefficients for lower frequency terms) from the object block. Generally speaking, larger values tend to concentrate to lower frequency coefficients in an orthogonally transformed block as is well known in the art. In other words, lower frequency coefficients contain major part of the information of the entire block. Therefore, extracting lower frequency components from each block enables a decrease in information quantity caused by the sampling of coefficients to be held down to a satisfactorily low level.

In step 44, CPU 10 orthogonally inverse transforms the extracted lower frequency components within the pattern. In step 46, CPU 10 searches a search range in the reference frame for a block having the maximum correlation with the object block. Specifically, a sum of absolute difference (SAD) between the object block and a tested block is calculated while advancing the tested block by one pixel within the search range after each test. Then, a block having the minimum SAD is detected. It is noted that for the above mentioned object block, a reference frame and a search range are specified in the form of arguments by the main program.

In step 48, CPU 10 calculates the motion vector from the object block to the found block. Finally, the CPU stores the motion vector in an assigned location in a motion vector storage area 24 in RAM 12 and ends the operation.

Some embodiments incorporating the above-described basic concept will be described in the following.

Embodiment I

FIG. 5 is a flowchart showing an exemplary operation of a DV-to-MPEG format converter program 5 incorporating a motion vector detector program 506 in accordance with a first illustrative embodiment of the invention. In MPEG coding, frames are either intra coded or predictive coded. Since intra coding has no need for motion compensation and accordingly no need for motion vectors. For this reason, it is assumed that the program 5 is executed only for predictive coded frames.

If the program 5 is started, then CPU 10 first sets object block coordinates (Bx, By) indicative of the position of the object block in a current frame of an input DV video so that the coordinates (Bx, By) indicate the object block, i.e., (Bx, By)=(1, 1) 1 in step 52. The object block is a block being processed at present.

In step 54, CPU 10 makes a test to see if the object block is the first block or top leftmost block of the macroblock to which the object block belongs, i.e., if both Bx and By are odd numbers. If so, CPU 10 detects a motion vector (MV) for the object block to store the detected MV in the MV storage area 24 as detailed below. Otherwise, CPU 10 proceeds to step 58 omitting the MV detection. This is because a motion vector is to be detected for each macroblock in MPEG coding.

If the MV detection of step 56 is completed or if the test result is NO in step 54, then CPU 10 decodes the DV format object block into an uncompressed data block in step 58 (DV decoder). In step 60, CPU 10 MPEG encodes the uncompressed data block into an MPEG coded block by using a MV data in the Mv storage area 24. In step 62, CPU 10 makes a test to see if the object block coordinates have reached the end block of the current frame. If so, CPU exits from the DV-to-MPEG format converter program 5. Otherwise, CPU advances the object block coordinates to the next block in step 64, and returns to step 54. In this way, the DV format is successfully converted to the MPEG format.

Figure 6A:
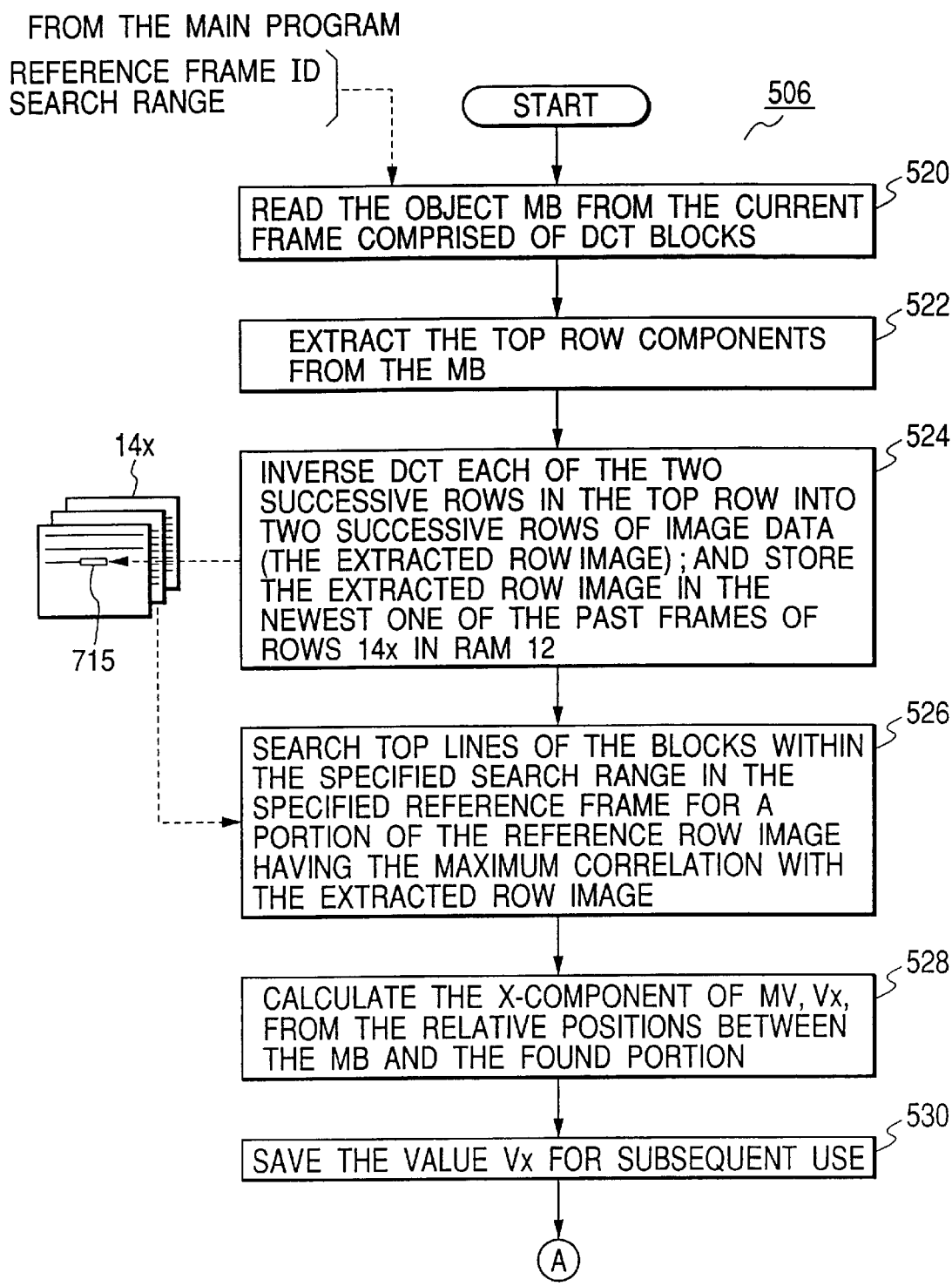
Figure 7:
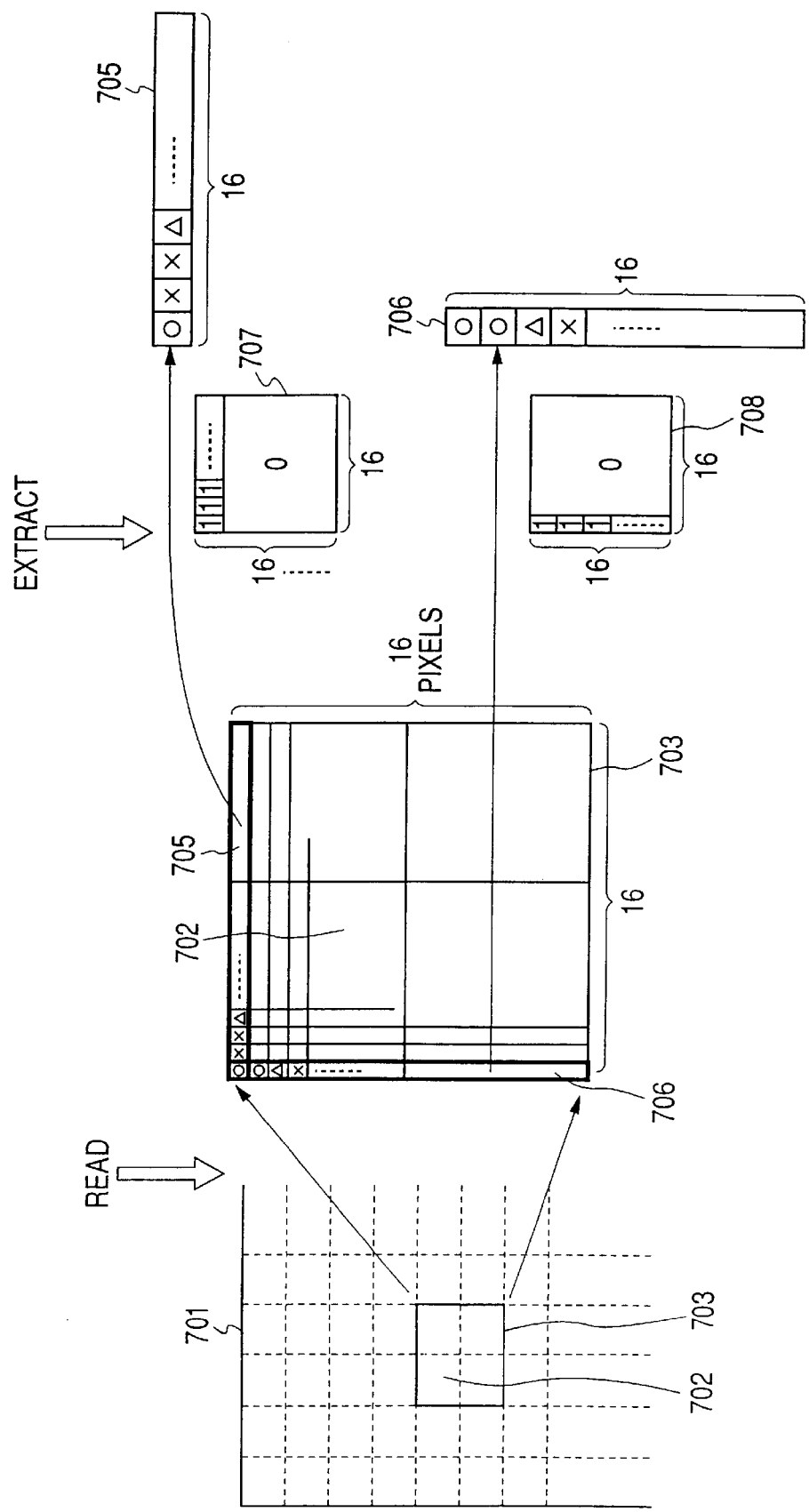
FIG. 7 is a diagram showing how a predetermined pattern of lower frequency components is extracted from the current macroblock.

FIGS. 6A and 6B, when combined at encircled "A", constitute a flowchart showing an operation of a motion vector (MV) detector program 506 according to the principles of the invention. It is assumed that the main program 5 informs the MV detector program 506 of which of the past frames in the past frame storage area 14 should be used as a reference frame with respect to which a MV of the object block is detected and a search range within which the MV detection for the object block is conducted. FIG. 7 shows the way a predetermined pattern of lower frequency components is extracted from the current macroblock.

In step 520, CPU 10 first reads the object macroblock 703 from the current frame 701 comprised of DCT blocks. Since this program 506 is executed at the beginning of a macroblock (MB) (e.g., 702), the object MB 703 comprises four DCT blocks including the object DCT block 702 in the upper left position as shown in FIG. 7. In step 522, CPU 10 extracts a predetermined pattern of lower frequency components or DCT coefficients from the object MB 703.

According to the principles of the invention, the predetermined pattern comprises the top row of a MB and the leftmost column of the MB. Accordingly, a mask 707 comprising a top row of the 16 elements being all 1's and the following 15 rows of all 0's in 16 elements is used to extract the top row 705 from the object MB 703 in step 522.

Figure 8:
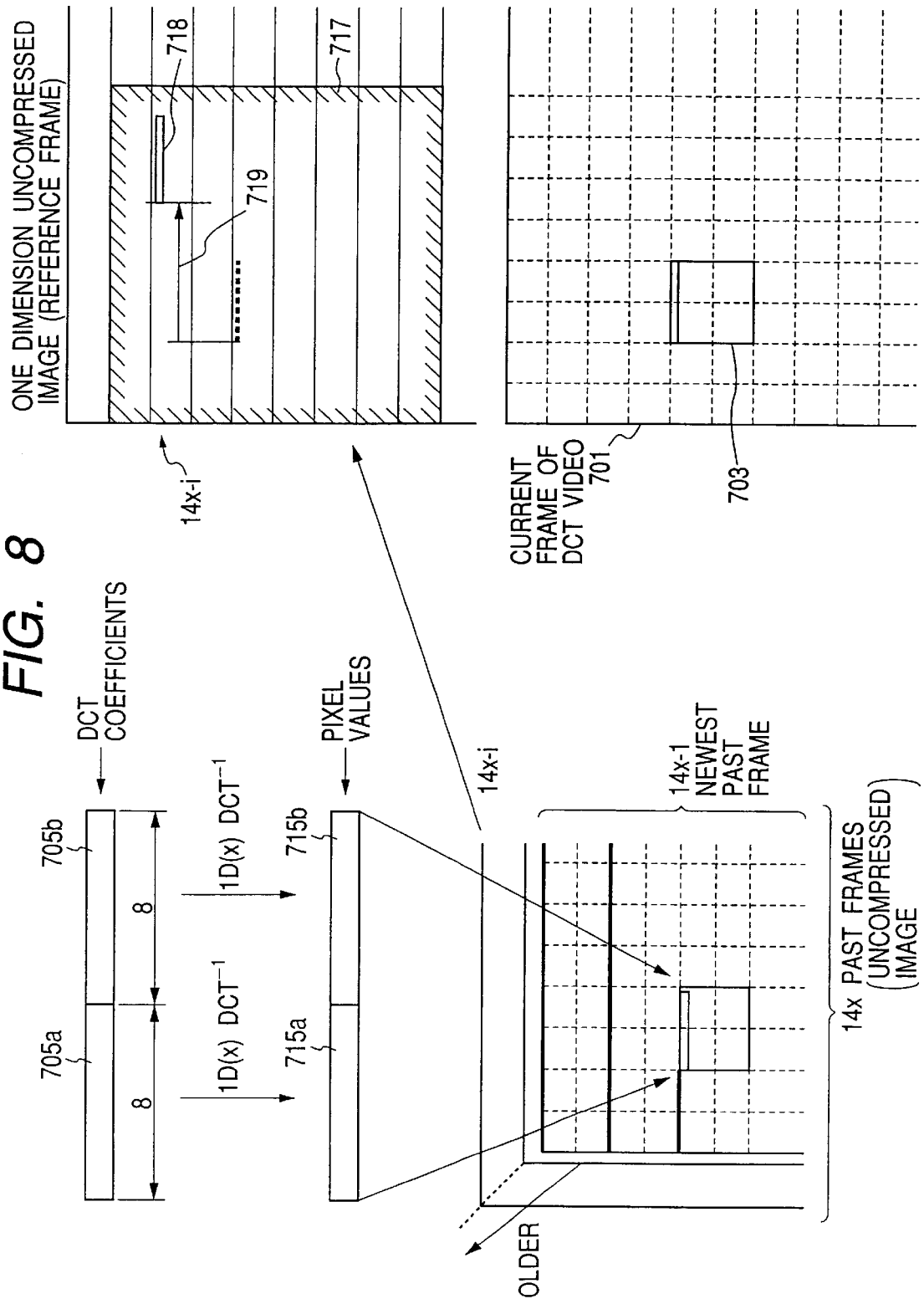
FIG. 8 is a diagram showing how the X component of the MV is calculated in accordance with the principles of the invention.

In step 524, CPU 10 inverse DCTs each of the two successive rows 705a and 705b in the top row 705 into two successive rows 715a and 715b of image data (hereinafter, referred to as the extracted row image 715); and stores the extracted rows image 715 in the newest one (14x-1) of the past frames of rows (one dimension image), 14x, in RAM 12 as shown in FIG. 8. In this way, extracted row images obtained so far have been stored in respective frames in the past frame storage area in RAM 12. It is noted that the past frame storage area of RAM 12 is wide enough to accommodate several past frames of one dimension image for both rows and columns (described below).

In step 526, CPU 10 searches top lines of the blocks within the specified search range 717 in the specified reference frame (14x-i) for a portion of the reference row image 14x-i having the maximum correlation with the extracted rows image 715 as shown in FIG. 8. Specifically, the extracted row image (or x-direction one-dimensional (or row) image) 715 is advanced one pixel by one along each of the lines in a search range 717 of the reference frame (14x-i) specified by the main routine (the DV-to-MPEG converter program 5 in this case). At each position, the sum of absolute difference (SAD) between the extracted row image 715 and the corresponding (or overlapped) portion of the reference row image (14x-1). A portion of the reference row image (14x-i) which has the minimum (SAD) is detected.

In step 528, CPU 10 calculates the x-component of the MV, Vx, from the relative position between the object MB and the detected portion. If the portion with the minimum (SAD) is at the position 718, then the x-component of the MV is detected as the length 719.

In the same manner, the y-component of the MV can be detected as shown in FIG. 6B.

In step 532, CPU 10 extracts the leftmost column components 706 from the object MB 703. In step 534, CPU 10 inverse DCTs each of the two successive columns in the leftmost column into two successive columns of image data (or the extracted row image), and stores the extracted row image in the newest one of the past frames of columns, 14y, in RAM 12. In step 536, CPU 10 searches leftmost lines of the blocks within the specified search range in the specified reference frame for a portion of the reference column image having the maximum correlation with the extracted column image. In step 538, CPU 10 calculates the y-component of the MV, Vy, from the relative positions between the object MV and the found portion. In step 540, CPU 10 stores the MV (Vx, Vy) in an assigned location (assigned to the object MB) in a motion vector storage area 24. This enables the main program 5 to use motion vectors for motion compensation.

If there is a need for motion vectors with a higher precision, the preciseness of MVs can be raised by calculating intermediate row images from adjacent row images of the reference row image 14x-i and interpolating the intermediate row images in between adjacent row images. This is also true to the y-component of the MV.

In the above example, two successive rows and columns have been extracted from the object MB. However, if a faster MV detection is required, a single row and column may be extracted from the object MB. If necessary, even smaller patterns such as 1×6, 6×1 or 1×4, 4×1 may be extracted.

In this embodiment, the MV detection is achieved by using both of x-direction components and y-direction components extracted from a two-dimension DCTed video. This provides the same precision as in case where a full search is performed on a two-dimension area.

Embodiment II

Figure 10:
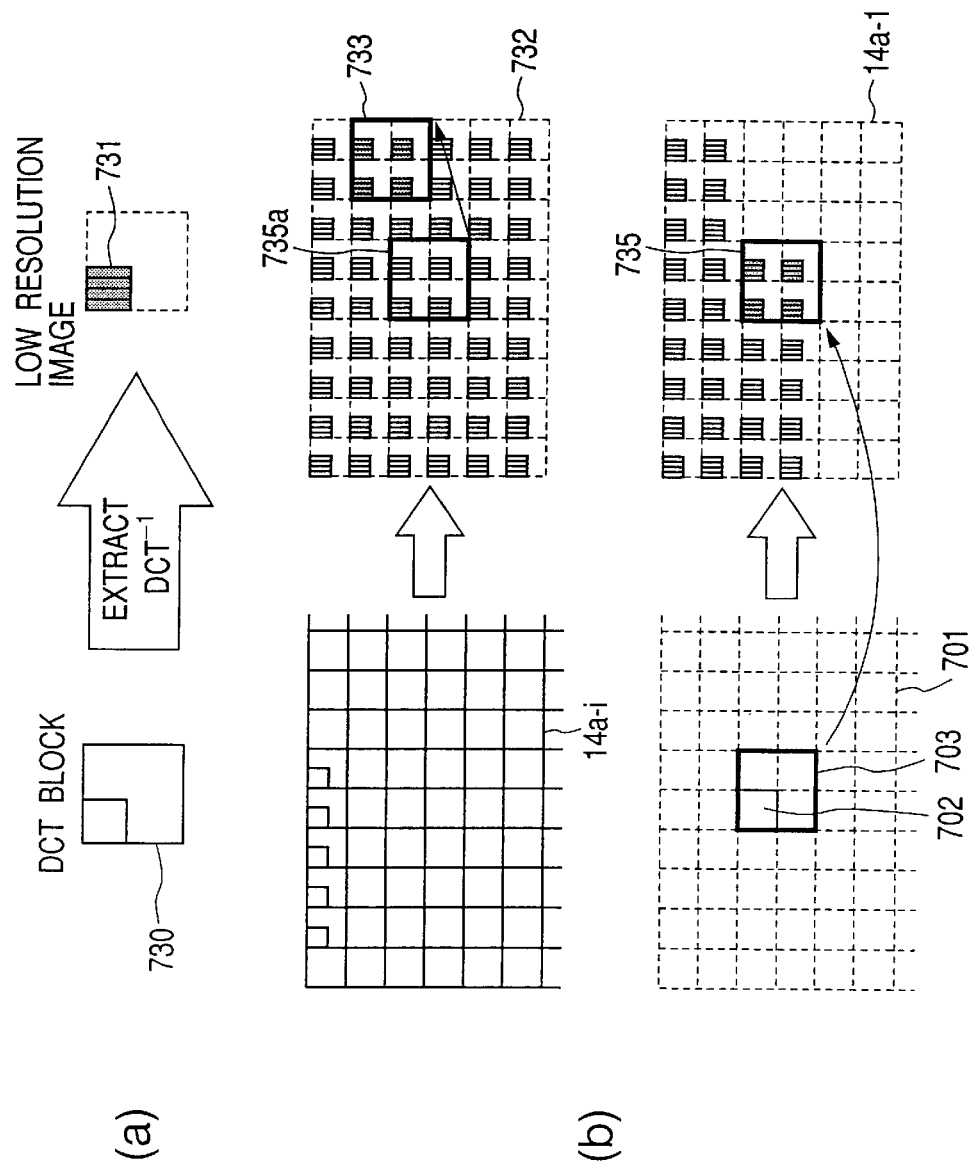
FIG. 10 is a diagram showing how a MV is detected in accordance with the principles of the invention.

A second illustrative embodiment of the invention is intended for use in combination with the first embodiment to further raise the Mv detection speed. FIG. 9 is a flowchart showing an exemplary operation of a MV detector program 600 in accordance with a second illustrative embodiment of the invention. FIG. 10 is a diagram showing how a MV is detected in accordance with the principles of the invention. In FIG. 9, CPU 10 first reads the object MV 703 from the current frame 701 comprised of DCT blocks 730 in step 601. In step 602, CPU 10 extracts the top leftmost block of 4×4 coefficients from each of the DCT blocks of the MB. In step 604, CPU 10 inverse DCTs each of the extracted blocks into a low resolution block 731 of 4×4 pixels; and stores the low resolution blocks 735 in the newest one (14a-1) of the past frames 14a stored in a past frame storage area 14 in RAM 12.

In step 606, CPU 10 searches a search range 732 in the reference frame (14a-i) for a block 733 having the maximum correlation with the low-resolution blocks 735 as shown in FIG. 10. The matching is achieved by calculating the SAD between the four low-resolution blocks 735 and each combination of 2×2 blocks in the search range 732. Once the four blocks 733 with the minimum SAD is found, CPU 10 calculates the motion vector from the object block to the found blocks 733 in step 608. Finally, CPU 10 stores the motion vector in an assigned location in a motion vector storage area 24.

Though the above-described embodiment has extracted 4×4 coefficients from the object MB, 2×2 coefficients may be extracted for a faster MV detection.

As described above, only low frequency components are extracted from a DCT transformed video signal and inverse transformed into a noncompressed image, and the MV detection is detected by using the noncompressed image. This enables the calculations for matching to be reduced. It only takes about a thirty-second of time to detect a motion vector as compared with a case of a full search.

However, this scheme fails to detect the length and the direction of the MV with a small step. For example, if a block of 4×4 pixels is used, motion vectors can be detected only with twice the step in case of a full search.

Accordingly, this embodiment is preferably used for limiting the search range. Specifically, this scheme is first used for limiting the search area; a high precision MV detecting techniques such as a full search or the system as described in a first embodiment is applied to the limited search range to obtain a final MV. By doing this, a high precision MV detection is achieved as a whole in a short period.

Modification of Embodiment I

Figure 11:
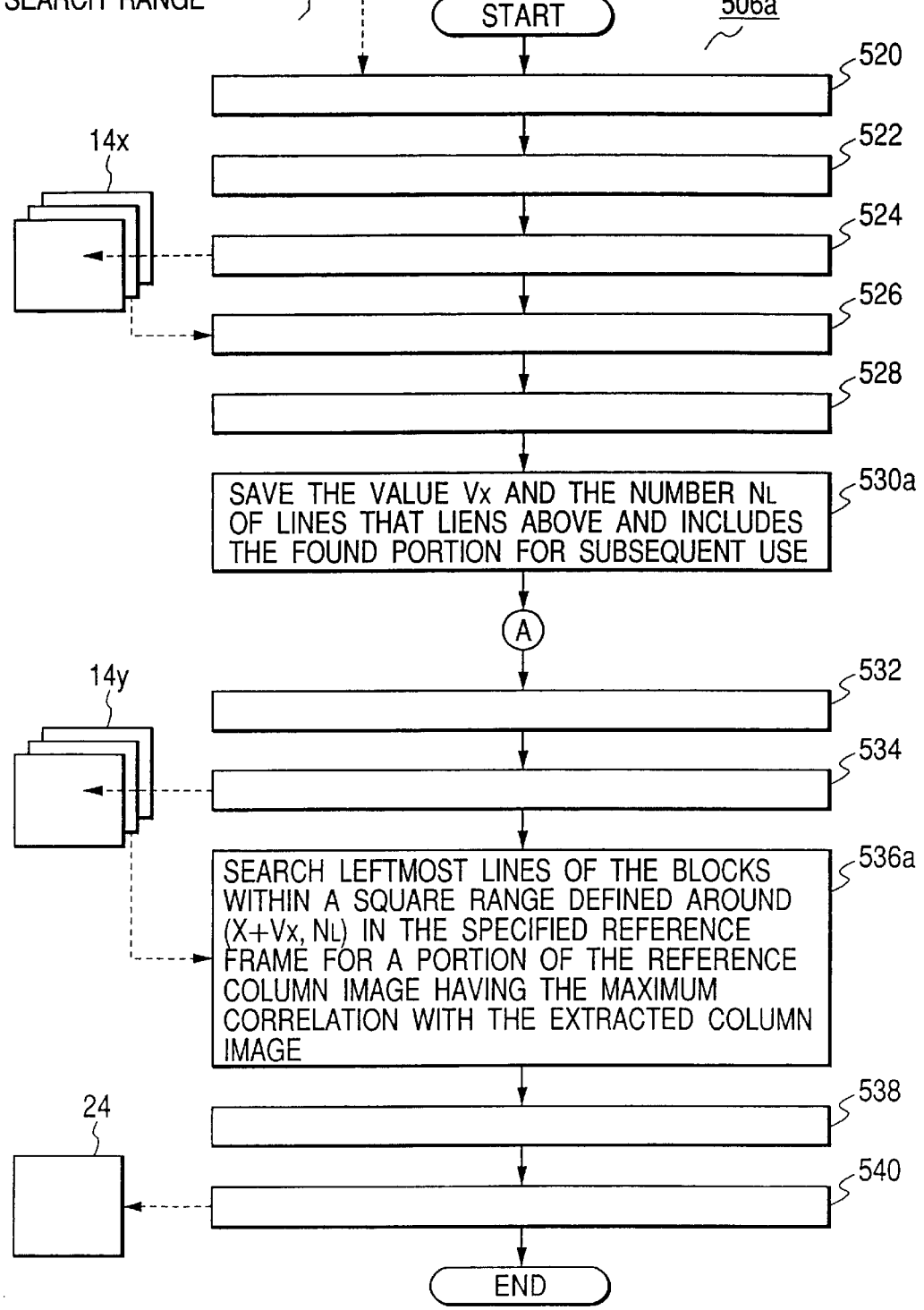
FIG. 11 is a flowchart showing an operation of a motion vector (Mv) detector program 506a according to the principles of the invention.
Figure 12:
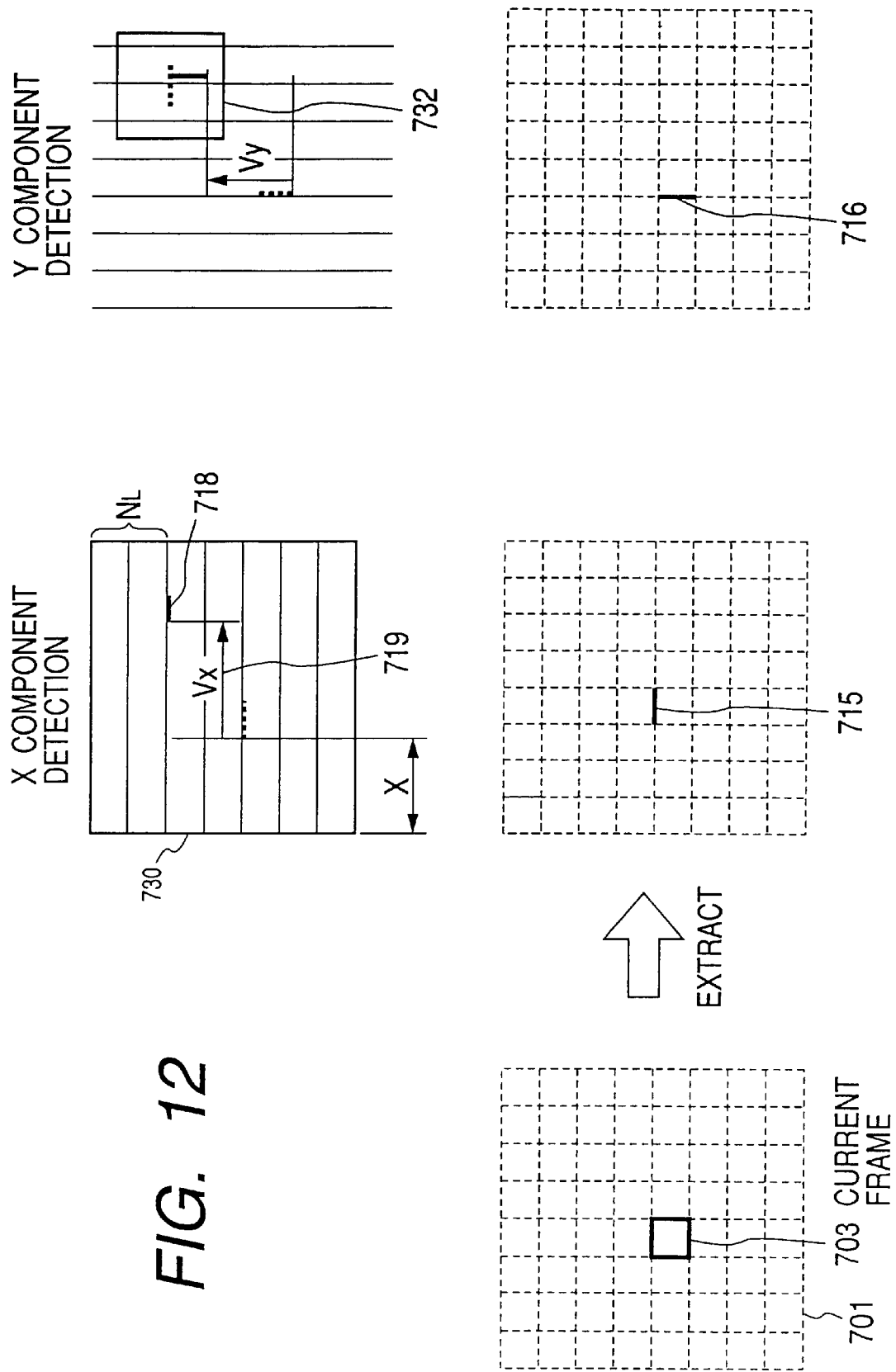
FIG. 12 is a diagram showing a novel way of detecting the y-component of the MV.

This modification is intended for reducing the searching process in the first embodiment. FIG. 11 is a flowchart showing an operation of a motion vector (Mv) detector program 506a according to the principles of the invention. The MV detector program 506a of FIG. 11 is identical to that of FIGS. 6A and 6B except that in FIG. 11 the steps 530 and 536 have been replaced with 530a and 536a, respectively. FIG. 12 shows a novel way of detecting the y-component of the MV. In FIG. 12, the numeral 703 is the object MB of the current frame 701, and the numerals 715 and 716 are the extracted row and column images from the MB 703 as described above.

Referring now to FIG. 11, after calculating the x component of the MV, Vx, from the relative position between the extracted row image 715 (or MB 703) and the found portion 718 in the search range 717 in the reference row image in step 538, CPU 10 saves the x component Vx and the number $N_L$ of the lines that lies above and includes the found portion 718 for subsequent use in step 530a.

Further, In searching step 536a, CPU 10 searches leftmost lines of the blocks within a square range 732 defined around (X+Vx, $N_L$) in the specified reference frame for a portion of the reference column image having the maximum correlation with the extracted column image. Here, the variable X is a distance in pixels from the leftmost side of the frame to the object MB 703. In this case, the square range 732 where a search for y component is conducted can be set much smaller than the search range 730. This reduces searching operation resulting in a raised speed of MV detection.

Figure 13:
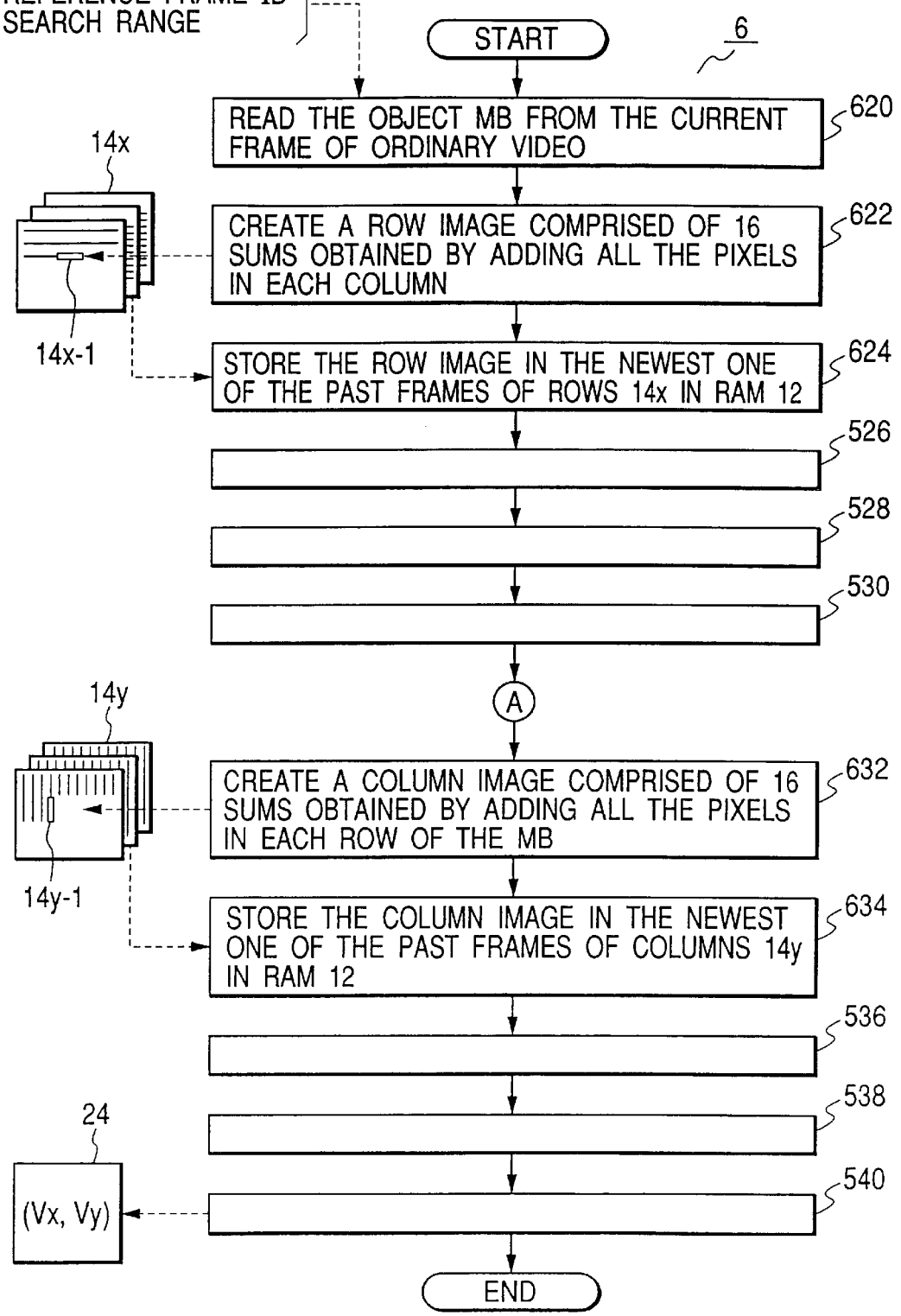
FIG. 13 is a flowchart showing an operation of a motion vector (MV) detector program for detecting a motion vector from an ordinary video data in accordance with the principles of the invention.

Though the above-described embodiments have dealt with an orthogonally transformed video, we will discuss a MV detector which detect a motion vector from an ordinary (noncompressed) video in the following. Detecting a Motion Vector from an ordinary Video—Embodiment III FIG. 13 shows an operation of a motion vector (MV) detector program 6 for detecting a motion vector from an ordinary video data in accordance with the principles of the invention. The program 6 of FIG. 13 is identical to that of FIGS. 6A and 6B except that the steps 520, 522, 524, 532 and 534 have been replaced with steps 620, 622, 624, 632 and 634, respectively in FIG. 13. So, only the differences are described in the following.

It is noted that the MV detector 6 of this embodiment is an extension of the principles applied to the first embodiment.

Figure 14:
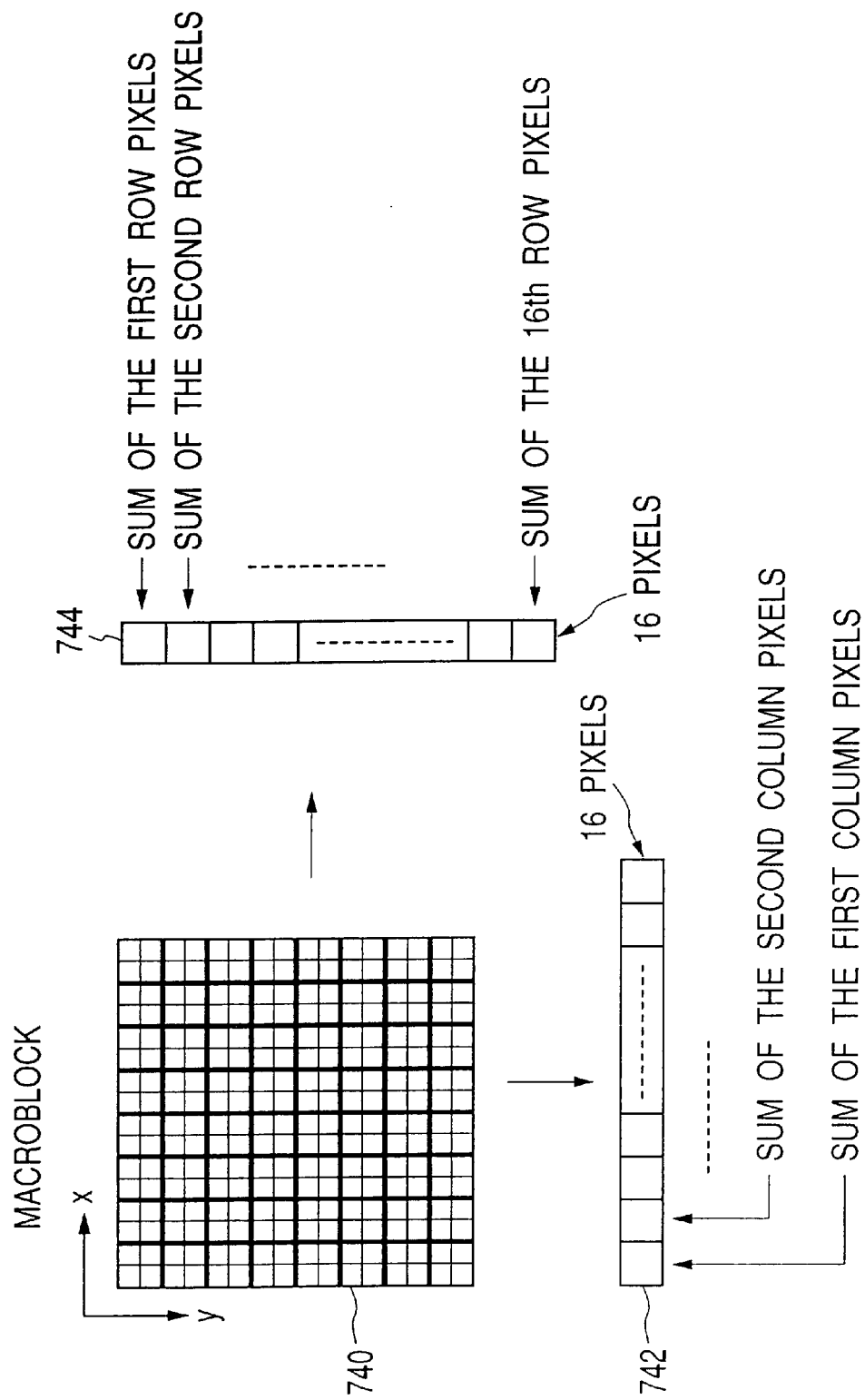
FIG. 14 is a diagram showing how a row image comprised of 16 sums is obtained by adding all the pixels in each of the columns of MB.

Since an MV detector 6 according to the embodiment deals with ordinary (noncompressed) moving pictures, it is assumed that the MV detector 6 is applied to an MPEG coder. In FIG. 13, CPU first read the object MB specified by a main program (the MPEG decoder in this example) from the current frame of an input (noncompressed) video in step 620. In step 622, CPU creates a row image 742 comprised of 16 sums obtained by adding all the pixels in each of the columns of the MB 740 as shown in FIG. 14. In step 624, CPU stores the row image 742 in the newest one (14x-1) of the past frames 14x of rows in RAM 12.

Similar operations are performed in the process of obtaining the y component of the MV 740. Specifically, in step 632, a column image 744 comprised of 16 sums is created by adding all the pixels in each of the rows of the MB 740 as shown in FIG. 14. In step 634, the column image 744 is stored in the newest one (14y-1) of the past frames 14y of columns in RAM 12.

It should be noted that the row image 742 and the column image 744 obtained in steps 622 and 632 are essentially equivalent to the extracted row image 715 and the extracted column image 716 obtained in the one-dimension (1D) inverse DCT steps 524 and 534. This will be understood through the following discussion referring to the following equations:

One dimension DCT (1)
$$F(u) = 2C(u)/N \sum_{j=0}^{N-1} f(j) \cos[(2j+1)up/2N]$$

$$\text{where } C(w) = \begin{cases} 1/2 \wedge (1/2), w = 0 \\ 1, w = 1, 2, \ldots, N-1. \end{cases}$$ (2)

Two dimension DCT (3)
$$F(u, v) = 4(C(u)C(v))/N \wedge 2 \sum_{j=0}^{N-1} \sum_{k=0}^{N-1} f(j, k)$$
$$\cos[(2j+1)up/2N]\cos[(2k+1)vp/2N]$$

DCT coefficients of the column for $v = 0$ (4)

$$F(u, 0) = 4(C(u)C(0))/N \wedge 2 \sum_{j=0}^{N-1} \sum_{k=0}^{N-1} f(j, k)\cos[(2j+1)up/2N]$$
$$= (2 \wedge (1/2)/N)(2C(u)/N) \sum_{j=0}^{N-1} \sum_{k=0}^{N-1} f(j, k)$$
$$\cos[(2j+1)up/2N]$$
$$= (2 \wedge (1/2)/N)(2C(u)/N) \sum_{j=0}^{N-1} g(j)\cos[(2j+1)up/2N]$$
$$= (2 \wedge (1/2)/N)G(u),$$

where $g(j) = \sum_{k=0}^{N-1} f(j, k)$ (5)

The equation (1) indicates a one-dimension DCT. In the equation, f is a value of pixel, F is converted DCT coefficients, N is a number indicative of a limit of the conversion domain, u is a parameter indicative of the direction of the one dimension. C(w) is a constant with a value as shown in equation (2).

The equation (3) indicates a two-dimension DCT to which the equation (1) has been extended. We consider the coefficients of the column for v=0, which is shown as equation (4). In the third line of equation (4), a substitution with equation (5) is made. G(u) in the fourth line of equation (4) is what is obtained by applying a one-dimension DCT to g(j). Since constants in DCT have essentially no significance, if the constants are neglected, it is concluded that the DCT coefficients of the 0th column are equivalent to those into which g is one dimension DCTed with respect to the x direction.

If we consider the y-direction one-dimension image obtained by the y-direction inverse DCT step 534 (i.e., the extracted column image) 716 (FIG. 6B), the extracted column image 716 is the 0th-column DCT coefficients expressed by equation (4), i.e., what results from a one-dimension. What results from a one-dimension inverse DCT of F(u,0) is just g(j). Since "j" indicates a row of the block, g(j) of equation (5) is a sum of the pixels of the row j.

As seen from the foregoing, the y-direction one-dimension image 716 obtained in the one-dimension inverse DCT step 534 is equivalent to the row image 742 obtained in steps 632. Though we have made the above discussion in connection with the y direction, it is also true to the x direction.

The other operations are identical to those of FIGS. 6A and 6B.

In this embodiment, representative one-dimension image is created for each direction (x, y) from a two dimension image; a motion vector is detected by using the representative one-dimension image. This enables motion vector detection of the same precision as in case of full search. Thus, a MV detector according to the third embodiment can detect a motion vector with a higher precision at a higher speed.

Modifications

In the above-described embodiments, the past frames which are used as a reference frame in the detection of motion vector has been generated from the input video. However, generating the past frames from the DCT blocks intermediately generated by the decoder incorporated in the MPEG encoder results in such moving vectors as to keep down pixel values in a block difference to a small level, causing the enhancement of the compression efficiency and the picture quality.

FIG. 15 a flowchart showing an operation of a program 650, for use in a MV detector, for generating past frames from the DCT blocks supplied from the MPEG coder in which the MV detector is incorporated. It is assumed that information on the reference frame ID and whether the current frame being processed is intra coded (i.e., motion compensated) is given to the program 650. The decoder in the MPEG coder has to store the dequantized DCT blocks in, for example, a DCT block buffer area (not shown) in RAM 12. Also it is noted that the MPEG coder which incorporate the program 650 have no need of the storing operation of step 524, 534, 604, 624, 634.

In FIG. 15, CPU 10 reads the MB of DCT blocks from the DCT block buffer area in RAM 12 in step 652. In step 654, the top row components are extracted from the DCT MB. In step 656, each of the two successive rows in the top row is inverse DCTed into 16-pixel rows image. In step 657, a test is made to see if the current frame is intra coded (motion compensated). If so, then, in step 658, CPU 10 reads the corresponding row image from the reference frame in the past row frames 14x; and store the sum of the read row image and the 16-pixel row image in the newest one of the past frames of rows 14x in RAM 12. Otherwise, CPU 10 stores the 16-pixel rows image as it is in the newest one of the past frames of rows 14x in RAM 12 in step 660. Thereafter, the similar operation is executed with respect to the y-direction as shown in FIG. 15.

In this example, the past frames are generated by using DCT blocks intermediately generated by the decoder portion of the MPEG coder. However, as a modification of the third embodiment, a motion vector may be detected by: obtaining blocks from the frame memory for use in the MPEG coder for storing predicted pictures; and creating the row and column images by summation from the obtained blocks.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of detecting a motion vector for an object block in a current frame of an orthogonally transformed video with respect to one of stored past frames, the method comprising the steps of:
   extracting a predetermined pattern of lower frequency components from said object block;
   orthogonally inverse transforming said extracted lower frequency components within said pattern to yield said pattern of pixel data;
   searching said one of said stored past frames for a best match having a maximum correlation with said pattern of pixel data; and
   calculating said motion vector from said object block to said best match having said maximum correlation.

2. A method as defined in claim 1, wherein said orthogonal transform is a DCT (discrete cosine transform) that is a high-efficiency coding scheme for an image.

3. A method as defined in claim 2, wherein said predetermined pattern is a top leftmost subblock of 4 by 4 components in said object block.

4. A method as defined in claim 2, wherein said object block is a macroblock which is defined in international moving picture coding standards and which contains 4 subblocks of 8 by 8 components, wherein said predetermined pattern comprises four squares of 4 by 4 components, said four squares being disposed in upper left corners of respective subblocks, and wherein the method further comprises the step of storing said pattern of pixel data in a newest one of said stored past frames which is being created.

5. A method as defined in claim 1, further comprising the step, preceding all said steps, of determining that said predetermined pattern should include a linear component.

6. A method of detecting a motion vector for an object block in a current frame of an orthogonally transformed video, the method comprising the steps of:
   finding an x-component of said motion vector for said object block, said step of finding an x-component comprising the steps of:
      extracting a top row of components from said object block;
      orthogonally inverse transforming said extracted components within said row to yield said row of pixels;
      storing said row of pixels in a newest one of stored past frames of pixel rows (stored past row frames);
      advancing along and searching said pixel rows of a reference one of said stored past row frames for a first best match having a maximum correlation with said row of pixels; and
      calculating said x-component of said motion vector from said top row of said object block to said first best match having said maximum correlation; and
   finding a y-component of said motion vector for said object block; said step of finding an x-component comprising the steps of:
      extracting a leftmost column of components from said object block;
      orthogonally inverse transforming said extracted components within said column to yield said column of pixels;
      storing said column of pixels in a newest one of stored past frames of pixel columns (stored past column frames);
      advancing along and searching pixel columns of a reference one of said stored past column frames for a second bast match having a maximum correlation with said column of pixels; and
      calculating said y-component of said motion vector from said leftmost column of said object block to said second best match.

7. A method as defined in claim 6, wherein said block is a macroblock that is defined in international moving picture coding standards using motion compensation.

8. A method as defined in claim 6, further comprising the step of selecting one of 8, 6, and 4 components as a length of said top row and said left most column.

9. A method as defined in claim 6, further comprising the steps of:
   in response to a success in a first one of said advancing and searching steps, measuring a position component, of said best match whichever first to be found, with respect to a direction different from that of said first search; and
   for a following one of said first advancing and searching step, setting a square search range around a position defined by a calculated component of said motion vector and said position component, wherein said following advancing and searching step includes the step of limiting said advancing and searching within said square search range around said position.

10. A method as defined in claim 6, further comprising the steps of:
   calculating intermediate row images from adjacent pixel rows of said reference one of said stored past row frames; and
   interpolating said intermediate row images in between said adjacent pixel rows, wherein said step of advancing along and searching said pixel rows includes the step of advancing along and searching said intermediate row images of said reference one of said stored past row frames.

11. A method as defined in claim 6, further comprising the steps of:
   calculating intermediate column images from adjacent pixel columns of said reference one of said stored past column frames; and interpolating said intermediate column images in between said adjacent pixel columns, wherein said step of advancing along and searching said pixel columns includes the step of advancing along and searching said intermediate column images of said reference one of said stored past column frames.

12. A method of detecting a motion vector for an object block in a current frame of a video, the method comprising the steps of:
   finding an x-component of said motion vector for said object block, said step of finding an x-component comprising the steps of:
      creating a row of image comprising sums each obtained by adding all the pixels in one of columns of said object block;
      storing said row of image in a newest one of stored past frames of pixel rows (stored past row frames);
      advancing along and searching pixel rows of a reference one of said stored past row frames for a first best match having a maximum correlation with said row of image; and
      calculating said x-component of said motion vector from an upside of said object block to said first bast match; and
   finding a y-component of said motion vector for said object block, said step of finding a y-component comprising the steps of:
      creating a column of image comprising sums each obtained by adding all the pixels in one of rows of said object block;
      storing said column of image in a newest one of stored past frames of pixel columns (stored past column frames);
      advancing along and searching pixel columns of a reference one of said stored past column frames for a second bast match having a maximum correlation with said column of image; and
      calculating said y-component of said motion vector from a leftmost side of said object block to said second bast match.

13. A method of detecting a motion vector for an object macroblock in a current frame of an orthogonally transformed video with respect to one of stored past frames, said macroblock being defined in international moving picture coding standards and comprising 4 blocks of 8 pixels, the method comprising the steps of:
   detecting a first moving vector with a reduced precision at a speed more than a thirty times that of a two-dimension full search, said step of detecting a first moving vector comprising the steps of:
      extracting a predetermined pattern of lower frequency components from said object macroblock, said predetermined pattern comprising four squares of 4 by 4 components, said four squares being disposed in upper left corners of respective one of said four blocks of said object macroblock;
      orthogonally inverse transforming said extracted lower frequency components within said pattern to yield said pattern of pixel data;
      storing said pattern of pixel data in a newest one of said stored past frames;
      searching said one of said stored past frames for a best match having a maximum correlation with said pattern of pixel data; and
      calculating said first motion vector from said object macroblock to said bast match having said maximum correlation; and
   detecting a second motion vector with a raised precision by searching only a neighborhood of a point pointed by said first moving vector.

14. A method for converting a first video of a DV format intended for a video cassette recorder into a second video of an MPEG format, the first video comprising DCT blocks (i.e., blocks of DCT coefficients), and said second video comprising macroblocks each comprising four of said DCT blocks, comprising the steps of:
   converting each of said DCT blocks into a block of uncompressed pixels;
   detecting a motion vector for an object one of said macroblocks in a current frame of said first video with respect to one of stored past frames; and
   MPEG encoding blocks of uncompressed pixels for said object macroblock by using said motion vector, said step of MPEG encoding said blocks including the step of compensating motions between said current frame and said one of stored past frames, wherein said step of detecting a motion vector for an object macroblock comprises the steps of:
      extracting a predetermined pattern of lower frequency components from said object macroblock;
      inverse discrete cosine transforming said extracted lower frequency components within said pattern to yield said pattern of pixels;
      searching said one of said stored past frames for a best match having a maximum correlation with said pattern of pixels; and
      calculating said motion vector from said object macroblock to said bast match having said maximum correlation.

15. A method as defined in claim 14, further comprising the step of storing said pattern of pixels in a newest one of said stored past frames which is under formation for future use as a reference frame to form said newest one.

16. A method as defined in claim 14, further comprising the step of storing said pattern of other pixels which are different from said pixels provided by said step of inverse discrete cosine transforming said extracted lower frequency in a newest one of said stored past frames which is under formation for future use as a reference frame to form said newest one.

17. A method as defined in claim 16, wherein said step of storing said pattern of other pixels in said newest one of said stored past frames comprises the steps of:
   obtaining a corresponding macroblock of four DCT blocks generated in said step of compensating motions;
   extracting said pattern of lower frequency components from said corresponding macroblock; and
   inverse discrete cosine transforming said extracted lower frequency components within said pattern to yield said pattern of said other pixels.

18. A video encoding method for encoding a noncompressed video bitstream into a compressed and coded video bit stream, comprising the steps of:
   collecting a macroblock of pixels from said noncompressed video bitstream, said macroblock being defined in international video coding standards in which motion compensation is practiced, said macroblock comprising 2-by-2 blocks of 8-by-8 pixels,
   detecting a motion vector for said macroblock in a current frame of said noncompressed video bitstream; and
   MPEG encoding said blocks for said macroblock by using said motion vector into spatially compressed blocks for said macroblock, said step of MPEG encoding said blocks including the step of compensating motions between said current frame and said one of stored past frames, wherein said step of detecting a motion vector for said macroblock comprises the steps of:
  finding an x-component of said motion vector for said macroblock, said step of finding an x-component comprising the steps of:
    creating a row of image comprising sums each obtained by adding all the pixels in one of columns of said macroblock;
    advancing along and searching pixel rows of a reference row frame of stored past row frames (i.e., stored past frames of pixel rows) for a first best match having a maximum correlation with said row of image; and
    calculating said x-component of said motion vector from an upside of said macroblock to said first bast match; and
  finding a y-component of said motion vector for said macroblock, said step of finding a y-component comprising the steps of:
    creating a column of image comprising sums each obtained by adding all the pixels in one of rows of said macroblock;
    advancing along and searching pixel columns of a reference column frame of stored past column frames (i.e., stored past frames of pixel columns) for a second bast match having a maximum correlation with said column of image; and
    calculating said y-component of said motion vector from a leftmost side of said macroblock to said second bast match.

19. A method as defined in claim 18, further comprising the steps of:
  storing said row of image in a newest row frame of said stored past row frames which is under formation for future use as said reference row frame to form said newest row frame; and
  storing said column of image in a newest column frame of stored past column frames which is under formation for future use as said reference column frame to form said newest column frame.

20. A method as defined in claim 18, further comprising the steps of:
  storing said row of other image which is different from said row of image provided by said step of creating a row of image in a newest row frame of said stored past row frames which is under formation for future use as a reference row frame to form said newest row frame; and
  storing said column of other image which is different from said column of image provided by said step of creating a column of image in a newest column frame of said stored past column frames which is under formation for future use as a reference column frame to form said newest column frame.

21. A method as defined in claim 20, wherein said step of storing said row of said other image in said newest row frame of said stored past row frames comprises the steps of:
  obtaining a corresponding macroblock of four DCT blocks generated in said step of compensating motions;
  extracting said upside of lower frequency components from said corresponding macroblock; and
  inverse discrete cosine transforming said extracted lower frequency components to yield a row of uncompressed image, and wherein said step of storing said column of said other image in said newest column frame of said stored past column frames comprises the steps of:
    obtaining a corresponding macroblock of four DCT blocks generated in said step of compensating motions;
    extracting said upside of lower frequency components from said corresponding macroblock; and
    inverse discrete cosine transforming said extracted lower frequency components to yield a column of uncompressed image.

22. A method as defined in claim 21, wherein said step of storing said row of said other image further comprises the steps of:
  if said current frame is intra coded, reading a corresponding row image from said reference row frame in said stored past row frames and storing a sum of said read row image and said row of uncompressed image in said newest row frame of said past row frames; and
  if said current frame is non-intra coded, storing said row of uncompressed image in said newest row of said past row frames, and wherein said step of storing said column of said other image further comprises the steps of:
    if said current frame is intra coded, reading a corresponding column image from said reference column frame in said stored past column frames and storing a sum of said read column image and said column of uncompressed image in said newest column frame of said past column frames; and
    if said current frame is non-intra coded, storing said column of uncompressed image in said newest column of said past column frames.

23. A system for detecting a motion vector for an object block in a current frame of an orthogonally transformed video with respect to one of stored past frames, the system comprising:
  means for extracting a predetermined pattern of lower frequency components from said object block;
  means for orthogonally inverse transforming said extracted lower frequency components within said pattern to yield said pattern of pixel data;
  means for searching said one of said stored past frames for a best match having a maximum correlation with said pattern of pixel data; and
  means for calculating said motion vector from said object block to said bast match having said maximum correlation.

24. A system as defined in claim 23, wherein said orthogonal transform is a DCT (discrete cosine transform) that is a high-efficiency coding scheme for an image.

25. A system as defined in claim 24, wherein said predetermined pattern is a top leftmost subblock of 4 by 4 components in said object block.

26. A system as defined in claim 24, wherein said object block is a macroblock which is defined in international moving picture coding standards and which contains 4 subblocks of 8 by 8 components, wherein said predetermined pattern comprises four squares of 4 by 4 components, said four squares being disposed in upper left corners of respective subblocks, and wherein the system further comprises means for storing said pattern of pixel data in a newest one of said stored past frames which is being created advancing along and searching said pixel rows of a reference one of said stored past row frames for a first best match having a maximum correlation with said row of pixels.

27. A system as defined in claim 23, wherein said predetermined pattern includes a linear component.

28. A system for detecting a motion vector for an object block in a current frame of an orthogonally transformed video, the system comprising:
  means for finding an x-component of said motion vector for said object block, said means for finding an x-component comprising:
    means for extracting a top row of components from said object block;
    means for orthogonally inverse transforming said extracted components within said row to yield said row of pixels;
    means for storing said row of pixels in a newest one of stored past frames of pixel rows (stored past row frames);
    advancing along and searching said pixel rows of a reference one of said stored past row frames for a first best match having a maximum correlation with said row of pixels; and
    means for calculating said x-component of said motion vector from said top row of said object block to said first best match having said maximum correlation; and
  means for finding a y-component of said motion vector for said object block; said means for finding an x-component comprising:
    means for extracting a leftmost column of components from said object block;
    means for orthogonally inverse transforming said extracted components within said column to yield said column of pixels;
    means for storing said column of pixels in a newest one of stored past frames of pixel columns (stored past column frames);
    means for advancing along and searching pixel columns of a reference one of said stored past column frames for a second bast match having a maximum correlation with said column of pixels; and
    means for calculating said y-component of said motion vector from said leftmost column of said object block to said second best match.

29. A system as defined in claim 28, wherein said block is a macroblock that is defined in international moving picture coding standards using motion compensation.

30. A system as defined in claim 28, further comprising means for selecting one of 8, 6, and 4 components as a length of said top row and said left most column.

31. A system as defined in claim 28, further comprising:
  means, responsive to a success in said searching said pixel, for measuring a vertical component of a position of said first best match; and
  means for setting a square search range around said position of said first best match, wherein said means for advancing along and searching said pixel columns includes means for limiting said advancing along and searching within said square search range around said position.

32. A system as defined in claim 28, further comprising:
  means for calculating intermediate row images from adjacent pixel rows of said reference one of said stored past row frames; and
  means for interpolating said intermediate row images in between said adjacent pixel rows, wherein said means for advancing along and searching said pixel rows includes means for advancing along and searching said intermediate row images of said reference one of said stored past row frames.

33. A system as defined in claim 28, further comprising:
  means for calculating intermediate column images from adjacent pixel columns of said reference one of said stored past column frames; and
  means for interpolating said intermediate column images in between said adjacent pixel columns, wherein said means for advancing along and searching said pixel columns includes means for advancing along and searching said intermediate column images of said reference one of said stored past column frames.

34. A system for detecting a motion vector for an object block in a current frame of a video, the system comprising:
  means for finding an x-component of said motion vector for said object block, said means for finding an x-component comprising:
    means for creating a row of image comprising sums each obtained by adding all the pixels in one of columns of said object block;
    means for storing said row of image in a newest one of stored past frames of pixel rows (stored past row frames);
    means for advancing along and searching pixel rows of a reference one of said stored past row frames for a first best match having a maximum correlation with said row of image; and
    means for calculating said x-component of said motion vector from an upside of said object block to said first bast match; and
  means for finding a y-component of said motion vector for said object block, said means for finding a y-component comprising:
    means for creating a column of image comprising sums each obtained by adding all the pixels in one of rows of said object block;
    means for storing said column of image in a newest one of stored past frames of pixel columns (stored past column frames);
    means for advancing along and searching pixel columns of a reference one of said stored past column frames for a second bast match having a maximum correlation with said column of image; and
    means for calculating said y-component of said motion vector from a leftmost side of said object block to said second bast match.

35. A system of detecting a motion vector for an object macroblock in a current frame of an orthogonally transformed video with respect to one of stored past frames, said macroblock being defined in international moving picture coding standards and comprising 4 blocks of 8 pixels, the system comprising:
  means for detecting a first moving vector with a reduced precision at a speed more than a thirty times that of a two-dimension full search, said means for detecting a first moving vector comprising:
    means for extracting a predetermined pattern of lower frequency components from said object macroblock, said predetermined pattern comprising four squares of 4 by 4 components, said four squares being disposed in upper left corners of respective one of said four blocks of said object macroblock;
    means for orthogonally inverse transforming said extracted lower frequency components within said pattern to yield said pattern of pixel data;
    means for storing said pattern of pixel data in a newest one of said stored past frames;
    means for searching said one of said stored past frames for a best match having a maximum correlation with said pattern of pixel data; and means for calculating said first motion vector from said object macroblock to said bast match having said maximum correlation; and means for detecting a second motion vector with a raised precision by searching only a neighborhood of a point pointed by said first moving vector.

36. A system for converting a first video of a DV format intended for a video cassette recorder into a second video of an MPEG format, the first video comprising DCT blocks (i.e., blocks of DCT coefficients), and said second video comprising macroblocks each comprising four of said DCT blocks, comprising:

means for converting each of said DCT blocks into a block of uncompressed pixels;

means for detecting a motion vector for an object one of said macroblocks in a current frame of said first video with respect to one of stored past frames; and means for MPEG encoding blocks of uncompressed pixels for said object macroblock by using said motion vector, said means for MPEG encoding said blocks including means for compensating motions between said current frame and said one of stored past frames, wherein said means for detecting a motion vector for an object macroblock comprises:

means for extracting a predetermined pattern of lower frequency components from said object macroblock;

means for inverse discrete cosine transforming said extracted lower frequency components within said pattern to yield said pattern of pixels;

means for searching said one of said stored past frames for a best match having a maximum correlation with said pattern of pixels; and means for calculating said motion vector from said object macroblock to said bast match having said maximum correlation.

37. A system as defined in claim 36, further comprising means for storing said pattern of pixels in a newest one of said stored past frames which is under formation for future use as a reference frame to form said newest one.

38. A system as defined in claim 36, further comprising means for storing said pattern of other pixels which are different from said pixels provided by said means for inverse discrete cosine transforming said extracted lower frequency in a newest one of said stored past frames which is under formation for future use as a reference frame to form said newest one.

39. A system as defined in claim 38, wherein said means for storing said pattern of other pixels in said newest one of said stored past frames comprises:

means for obtaining a corresponding macroblock of four DCT blocks generated in said means for compensating motions;

means for extracting said pattern of lower frequency components from said corresponding macroblock; and means for inverse discrete cosine transforming said extracted lower frequency components within said pattern to yield said pattern of said other pixels.

40. A video encoding system for encoding a noncompressed video bitstream into a compressed and coded video bit stream, comprising:

means for collecting a macroblock of pixels from said noncompressed video bitstream, said macroblock being defined in international video coding standards in which motion compensation is practiced, said macroblock comprising 2-by-2 blocks of 8-by-8 pixels, means for detecting a motion vector for said macroblock in a current frame of said noncompressed video bitstream; and means for MPEG encoding said blocks for said macroblock by using said motion vector into spatially compressed blocks for said macroblock, said means for MPEG encoding said blocks including means for compensating motions between said current frame and said one of stored past frames, wherein said means for detecting a motion vector for said macroblock comprises:

means for finding an x-component of said motion vector for said macroblock, said means for finding an x-component comprising:

means for creating a row of image comprising sums each obtained by adding all the pixels in one of columns of said macroblock;

means for advancing along and searching pixel rows of a reference row frame of stored past row frames (i.e., stored past frames of pixel rows) for a first best match having a maximum correlation with said row of image; and means for calculating said x-component of said motion vector from an upside of said macroblock to said first bast match; and means for finding a y-component of said motion vector for said macroblock, said means for finding a y-component comprising:

means for creating a column of image comprising sums each obtained by adding all the pixels in one of rows of said macroblock;

means for advancing along and searching pixel columns of a reference column frame of stored past column frames (i.e., stored past frames of pixel columns) for a second bast match having a maximum correlation with said column of image; and means for calculating said y-component of said motion vector from a leftmost side of said macroblock to said second bast match.

41. A system as defined in claim 40, further comprising:

means for storing said row of image in a newest row frame of said stored past row frames which is under formation for future use as said reference row frame to form said newest row frame;

means for storing said column of image in a newest column frame of stored past column frames which is under formation for future use as said reference column frame to form said newest column frame.

42. A system as defined in claim 40, further comprising:

means for storing said row of other image which is different from said row of image provided by said means for creating a row of image in a newest row frame of said stored past row frames which is under formation for future use as a reference row frame to form said newest row frame; and means for storing said column of other image which is different from said column of image provided by said means for creating a column of image in a newest column frame of said stored past column frames which is under formation for future use as a reference column frame to form said newest column frame.

43. A system as defined in claim 42, wherein said means for storing said row of said other image in said newest row frame of said stored past row frames comprises:

means for obtaining a corresponding macroblock of four DCT blocks generated in said means for compensating motions;

means for extracting said upside of lower frequency components from said corresponding macroblock; and means for inverse discrete cosine transforming said extracted lower frequency components to yield a row of uncompressed image, and wherein said means for storing said column of said other image in said newest column frame of said stored past column frames comprises:
- means for obtaining a corresponding macroblock of four DCT blocks generated in said means for compensating motions;
- means for extracting said upside of lower frequency components from said corresponding macroblock; and
- means for inverse discrete cosine transforming said extracted lower frequency components to yield a column of uncompressed image.

44. A system as defined in claim 43, wherein said means for storing said row of said other image further comprises:
- means, operative in the event said current frame is intra coded, for reading a corresponding row image from said reference row frame in said stored past row frames and storing a sum of said read row image and said row of uncompressed image in said newest row frame of said past row frames; and
- means, operative in the event said current frame is non-intra coded, for storing said row of uncompressed image in said newest row of said past row frames, and wherein said means for storing said column of said other image further comprises:
- means, operative in the event said current frame is intra coded, for reading a corresponding column image from said reference column frame in said stored past column frames and storing a sum of said read column image and said column of uncompressed image in said newest column frame of said past column frames; and
- means, operative in the event said current frame is non-intra coded, for storing said column of uncompressed image in said newest column of said past column frames.

* * * * *

UNITED STATES PATENT AND TRADEMARK OFFICE
CERTIFICATE OF CORRECTION

PATENT NO. : 6,925,121 B1
APPLICATION NO. : 09/164333
DATED : August 2, 2005
INVENTOR(S) : Komiya et al.

Page 1 of 2

It is certified that error appears in the above-identified patent and that said Letters Patent is hereby corrected as shown below:

Column 11, line 37 begins "frequency components within said pattern to yield said", should read "frequency components within said pattern to yield a"

Column 13, line 23 begins "from an upside of said object block to said first bast", should read "from an upside of said object block to said first best"

Column 13, line 40 begins "second bast match", should read "second best match"

Column 13, line 66 begins "macroblock to said bast match having said maximum" should read "macroblock to said best match having said maximum"

Column 14, line 31 begins "roblock to said bast match having said maximum" should read "roblock to said best matching having said maximum"

Column 15, line 18 begins "bast match" should read "best match"

Column 15, line 28 begins "for a second bast match having maximum cor-" should read "for a second best match having a maximum cor-"

Column 15, line 32 begins "second bast match" should read --second best match"

Column 16, line 41 begins "tern to yield said pattern of pixel data;" should read "tern to yield a pattern of pixel data;"

Column 16, line 46 begins "block to said bast match having said maximum correlation" should read " block to said best match having said maximum correlation"

Column 17, line 37 begins "frames for a second bast match having a maximum" should read "frames for a second best match having a maximum"

Column 18, line 27 begins "first bast match; and" should read "first best match; and"

Column 18, line 39 begins "frames for a second bast match having a maximum" should read "frames for a second best match having a maximum"

Column 18, line 43 begins "said second bast match." should read "said second best match."

Column 19, line 2 begins "object macroblock to said bast match having said" should read "object macroblock to said best match having said"

UNITED STATES PATENT AND TRADEMARK OFFICE
CERTIFICATE OF CORRECTION

PATENT NO. : 6,925,121 B1
APPLICATION NO. : 09/164333
DATED : August 2, 2005
INVENTOR(S) : Komiya et al.

It is certified that error appears in the above-identified patent and that said Letters Patent is hereby corrected as shown below:

Column 19, line 33 begins "object macroblock to said bast match having said" should read "object macroblock to said best match having said"

Column 20, line 22 begins "to said first bast match; and" should read "to said first best match; and"

Column 20, line 32 begins "columns) for a second bast match having a maxi-" should read "columns) for a second best match having a maxi-"

Column 20, line 36 begins "roblock to said second bast match." should read "roblock to said second best match."

Signed and Sealed this

Twenty-second Day of August, 2006

JON W. DUDAS
*Director of the United States Patent and Trademark Office*